United States Patent [19]
Pryor

[11] 3,884,581
[45] *May 20, 1975

[54] DIFFRACTOGRAPHIC AND OTHER SENSORS UTILIZING DIFFRACTION WAVES
[76] Inventor: Timothy R. Pryor, 5423 York Ln., Bethesda, Md. 20014
[ * ] Notice: The portion of the term of this patent subsequent to May 23, 1989, has been disclaimed.
[22] Filed: May 15, 1972
[21] Appl. No.: 253,421

Related U.S. Application Data
[63] Continuation-in-part of Ser. No. 751,615, Aug. 9, 1968, Pat. No. 3,664,739.

[52] U.S. Cl. .............................. 356/109; 356/111
[51] Int. Cl. ............................................ G01b 9/02
[58] Field of Search .............................. 73/88, 100; 356/106–113, 159; 350/3.5

[56] References Cited
UNITED STATES PATENTS
3,354,311  11/1967  Vali et al. ........................... 356/106
3,503,687  3/1970  Venema ............................. 356/106
3,507,596  4/1970  Bliek et al. ......................... 356/106
3,518,007  6/1970  Ito ...................................... 356/159
3,572,935  3/1971  Howell .............................. 356/106
3,606,517  9/1971  Jacobson et al. .................. 350/3.5
3,709,610  1/1973  Kruegle ............................. 356/111

OTHER PUBLICATIONS
Jenkins, et al., Fundamentals of Optics; pp. 292–295, McGraw–Hill 1957.
"Higher Order Lloyd Interferometer", p. 1838, Applied Optics, Vol. 9, No. 8, 8/70.

Primary Examiner—Ronald L. Wibert
Assistant Examiner—Conrad Clark
Attorney, Agent, or Firm—Larson, Taylor & Hinds

[57] ABSTRACT
A method and device for sensing changes in separation of a first member relative to a second member, as well as variables causing such changes is disclosed. Electromagnetic waves diffracted by means included in said first member interact with waves from means included in said second member to form a characteristic interference pattern. Measured changes in this pattern allow determination of changes in separation.

57 Claims, 10 Drawing Figures

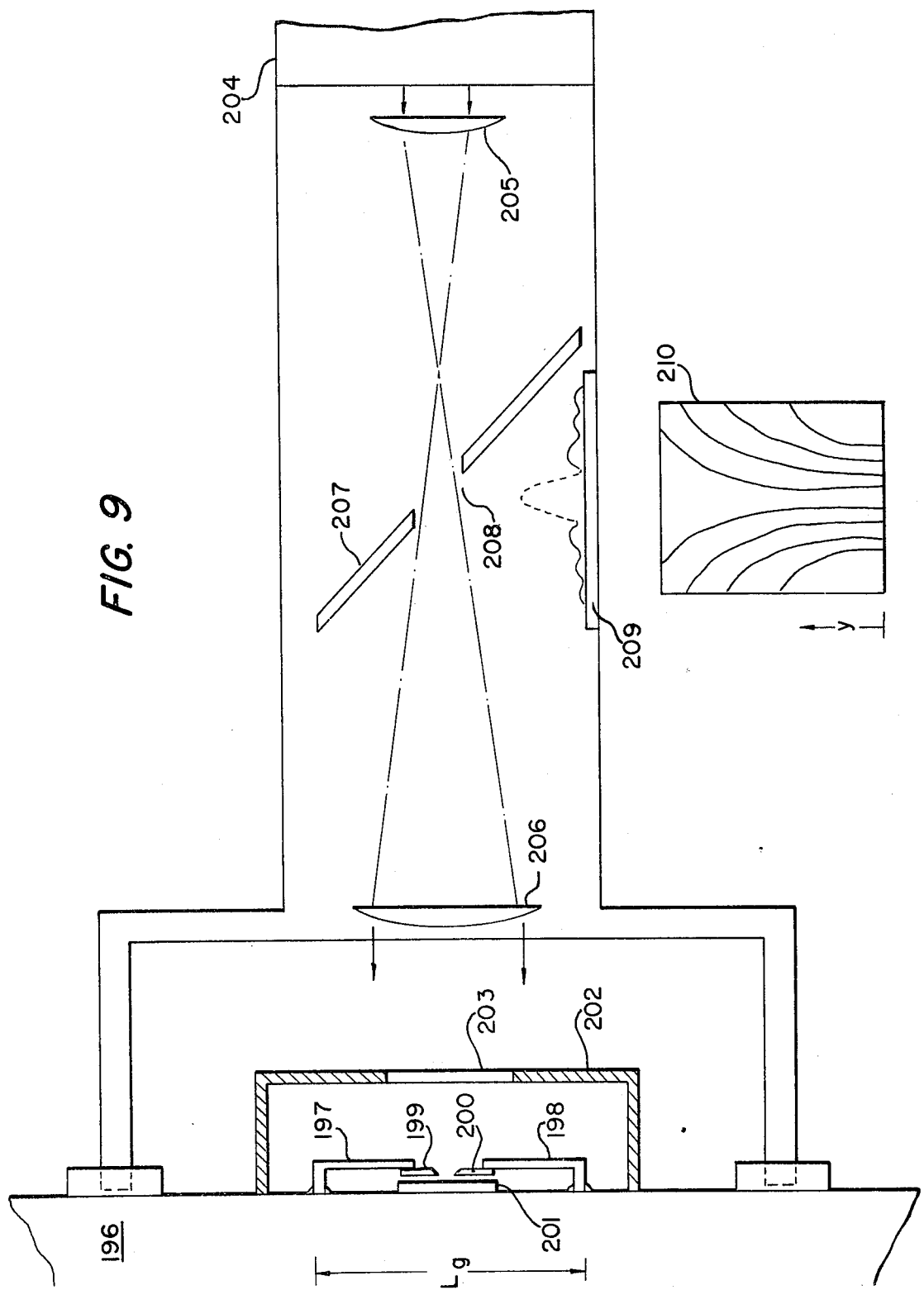

DIFFRACTOGRAPHIC AND OTHER SENSORS UTILIZING DIFFRACTION WAVES

CROSS REFERENCE TO RELATED APPLICATION

This application is a continuation-in-part of my copending U.S. application Ser. No. 751,615 filed Aug. 9, 1968, now U.S. Pat. No. 3,664,739 issued May 23, 1972.

Reference is made to Ph.D Thesis by T. R. Pryor entitled "The Diffractographic Method", Dept. of Mechanical Engineering, University of Windsor, Windsor, Ontario, Can.

BACKGROUND

This invention relates generally to measurement of displacement. In particular, it relates to a method for using electromagnetic wave interference pattern changes to effect such results.

Displacement measuring devices form the backbone of all industrial and research dimensional measurement, as well as provide the basis for most transducers of force, pressure, and other variables. Mechanical multiplication, air pressure change, resistive, capacitive, and inductive/reactive techniques are most common and form the basis of virtually all systems in practical industrial use.

While present methods have progressed to a high state of refinement, several problem areas remain. First, all electrical transduction means in common use today produce analog varying output signals which must be electronically converted if a digital readout or computer is used. The conversion process introduces errors and complexity, and it has been the goal of considerable transducer research to develop practical, intrinsically digital or at least quasi-digital transduction means obviating the need for such analog to digital (A-D) conversion.

Another widespread problem is maintenance and calibration of present transducer systems. Time and environmental effects, together with amplifier drift, all cause heretofore constructed devices to lose their calibrated performance (eg. in a load cell, voltage output per pound of force applied) specification. Periodic recalibration is therefore necessary, a time consuming job in many cases.

When the "rezeroing" or calibration required by present displacement sensing systems cannot be performed, such devices are essentially worthless. For example, long term, accurate measurement of strain or displacement in structural members (bridges, dams, pipelines, aircraft etc.) is difficult, if not impossible using present techniques. Thus, in many instances, no practical, accurate means of long term monitoring of the safety of such structures has been possible heretofore.

Another displacement measurement problem with many present systems is erroneous readings caused by the necessity of the gaging system to contact the member whose displacement is desired. In addition, many applications virtually require that no contact be made, a case in point being displacements of vibrating members. For measurement of such displacements it is necessary to have a high degree of accuracy, sufficient frequency response, and it is highly desirable that no modification of any kind be made to the member measured. Capacitive, inductive and laser interferometer gages have been used, and none fulfills all requirements.

In view of the above difficulties, together with intrinsic non-linearities, susceptabilities to vibration, voltage fluctuations, stray electric fields, and the like, present electrical displacement transduction systems seldom have accuracies of more than 1 part in 200 of full scale range. Even in the case of resistance strain gage load cells (which are not displacement sensors per se), where most variables influencing their output can be compensated for over a small temperature range, the values of 1 part in 500 (of full scale load) often quoted are achieved only when frequent re-zeroing is possible — in many cases before each measurement.

Where dimensional measurement is performed over longer ranges, as in the control of machine tools, ever higher industrial requirements have necessitated installation of moire scale and laser interferometer apparatus. Because of the latter's expense, moire devices have been most used. Since their resolution depends on the number of gradations per unit length, such moire devices suffer manufacturing limitations on the length of fine-spaced (eg. 100 lines per mm) scales which can be obtained at reasonable cost. Even in the best versions, system accuracy is seldom greater than 3 microns per 30 cm.

It is an object therefore of this invention to provide a linear, quasi-digital, and extremely accurate non-contacting method and apparatus for sensing changes in the separation of two members.

It is also an object of this invention to provide a method and apparatus for sensing changes in separation which is capable of long term field use without frequent calibration or adjustment.

It is another object of the invention to provide means to determine changes in separation in two orthogonal directions.

It is yet another object of the invention to provide a means for accurately sensing displacements over ranges of one meter or more, without recourse to construction of finely spaced scales.

It is a further object of this invention to provide systems for the transduction of various quantities causing changes in the separation of two members.

Finally, it is an object of this invention to provide simple, inexpensive means for accomplishing the objects stated above.

BRIEF SUMMARY OF THE INVENTION

The foregoing and other objects which will be apparent to those having ordinary skill in the art are achieved according to the invention by providing a method of determining a change in the separation of first and second members, the first member including means for producing a first diffraction wave, the second member including means for producing a second diffraction wave, the second diffraction wave producing means being separated from the first diffraction wave producing means, said first and second diffraction waves each comprising a single boundary or a plurality of single boundaries spaced in a direction transverse to the direction of electromagnetic waves directed thereto, each of said single boundaries being capable of producing a single diffraction wave upon incidence thereon of said electromagnetic waves, the method comprising the steps of, directing electomagnetic waves onto the first and second diffraction wave producing means to produce an interference pattern including fringes positioned about an axis in the direction of propogation of the electromagnetic waves, the interference pattern being produced by interaction between the first and second waves, detecting changes in intensity at a location with detection means located at a fixed distance from the axis of the interference pattern to detect motion of the fringes of the interference pattern relative to the detection means, and counting the number of fringes moving relative to the detection means to determine a change in separation between the first and second diffraction wave producing means.

Apparatus according to the invention comprises means for directing electromagnetic waves onto the first and second diffraction wave producing means to produce an interference pattern including fringes positioned about an axis in the direction of propogation of the electromagnetic waves, the interference pattern being produced by interaction between the first and second waves, means for detecting the intensity of electromagnetic radiation located at a fixed distance from the axis of the interference pattern to detect changes in intensity to detect motion of the fringes of the interference pattern relative to the detection means, and means for counting the number of fringes moving relative to the detection means to determine a change in separation between the first and second diffraction wave producing means.

In another embodiment, changes in separation are determined by directing electromagnetic waves onto said first and second diffraction wave producing means to form an interference pattern, the interference pattern including maxima and minima and, being produced by interaction between the first and second waves, determining the location of a maximum or minimum of the interference pattern, comparing the location of the maxima or minima of the interference pattern with the location of the maxima or minima of a further interference pattern corresponding to a known separation of the first and second diffraction wave producing means, and determining from the comparison any change in separation of the first and second diffraction wave producing means relative to said known separation, and apparatus useful for this method comprises means for directing electromagnetic waves onto the first and second diffraction wave producing means to form an interference pattern, the interference pattern being produced by interaction between the first and second waves, means for determining the location of a maximum or minimum of the interference pattern, means for comparing the locations of a maximum or minimum of each of a plurality of the interference patterns, and means for determining from the comparison any changes in separation of the first and second diffraction wave producing means.

In a further embodiment, the method comprises directing electromagnetic waves onto the first and second diffraction wave producing means to form an interference pattern, the interference pattern being produced by interaction between the first and second waves, determining the spacing between two portions of the interference pattern, comparing the spacing of the portions of the interference pattern with the spacing of portions of a further interference pattern corresponding to a known separation of the first and second diffraction wave producing means, and determining from the comparison any change in separation of the first and second diffraction wave producing means, and apparatus useful for this method comprises means for directing electromangetic waves onto the first and second diffraction wave producing means to form an interference pattern, the interference pattern being produced by interaction between the first and second waves, means for determining the spacing between two portions of the interference pattern, means for comparing the spacing of the portions of each of a plurality of the interference patterns, and means for determining from the comparison any change in separation of the first and second diffraction wave producing means.

In a still further embodiment, the method comprises directing electomagnetic waves onto the first and second diffraction wave producing means to form an interference pattern, the interference pattern being produced by interaction between the first and second waves, comparing the interference pattern to a further interference pattern produced by directing electromagnetic radiation onto the first and second diffraction wave producing means at a time when the first and second diffraction wave producing means are separated a known distance, and determining from said comparison any difference in the separation of the first and second diffraction wave producing means relative to the known distance. Apparatus useful for this method comprises means for directing electromagnetic waves onto said first and second diffraction wave producing means to form an interference pattern, the interference pattern being produced by interaction between the first and second waves, and means for comparing the interference pattern to a further interference pattern produced by directing electromagnetic radiation onto the first and second diffraction wave producing means at a time when the first and second diffraction wave producing means are separated a known distance, and means for determining from the comparison any difference in the separation of the first and second diffraction wave producing means relative to the known distance.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 9 is a diagrammatic side elevation view of a strain measuring device according to the invention;

Figure 1:
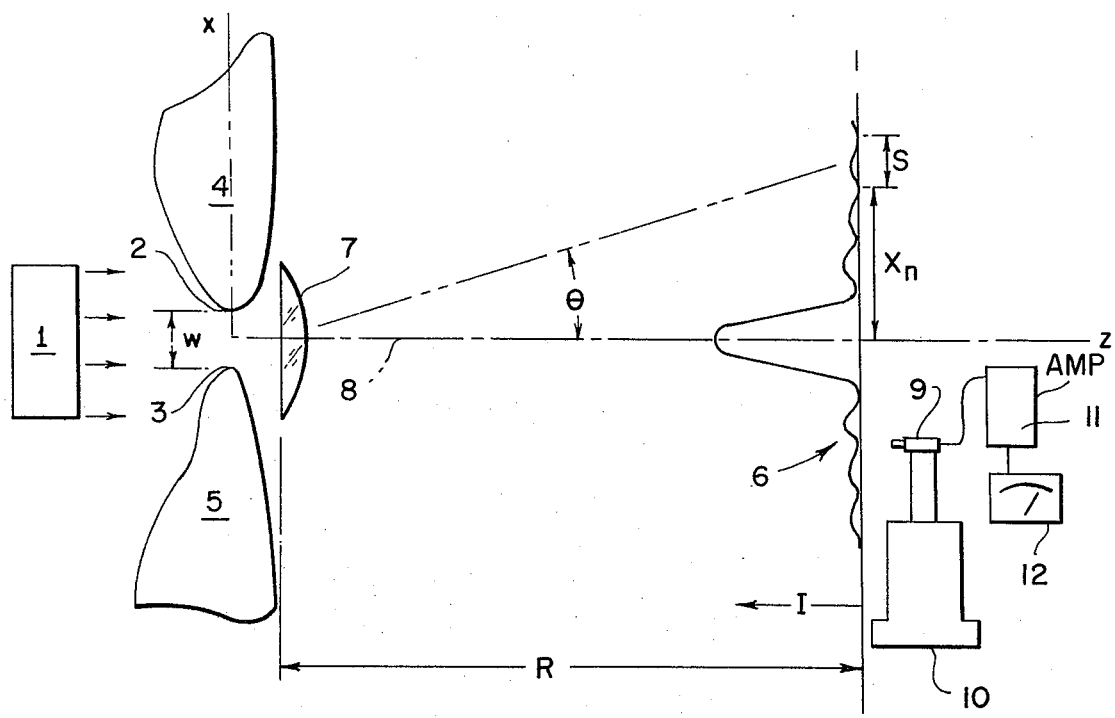
FIG. 1 is a diagrammatic side elevation view of a displacement measuring apparatus according to the invention including two members each having a diffracting boundary.

The present invention is essentially a very considerable extension of that described in my co-pending U.S. application Ser. No. 751,615 filed Aug. 4, 1968, now U.S. Pat. No. 3,664,739 issued May 23, 1972, describing measurement of changes in the separation of adjacent members through analysis of Fraunhofer type diffraction patterns produced when the slit aperture formed by opposing edges of the members is irradiated with electromagnetic waves. I have coined the name "Diffractographic" to describe this method and it has been the subject of many scientific papers published or in press at this time.

The diffraction pattern of a slit has a well known intensity distribution, symmetric about the incident wave axis and composed of fringes whose intensity decreases with distance from the pattern centerline and whose position is a function of the slit width.

In practicing the invention, I have found that the term diffraction pattern is somewhat of a misnomer, since it is essentially interference of coherently related waves, one from each edge boundary of the slit, which produces the fringes used. This conclusion can be effectively demonstrated by illuminating the region of the two edges with phase related laser beams, leaving the center of the slit unilluminated. The essential region comprising the fringes used by the invention is produced just as in the classical textbook case of uniform illumination across the slit — even though the central region is dark.

Another demonstration of the interference of diffraction waves is provided by two razor blade edges inserted in a plane perpendicular to a gas laser beam at some skew angle with respect to one another. Each produces an easily observed diffraction wave in the plane perpendicular to its edge, and emanating therefrom. However, no fringes form, as the waves are propagating in different planes. As the blades are rotated into parallelism, thereby forming a slit, the two diffraction wavefronts being to overlap, and as they do, fringes form — a function of the phase relation of the two boundary waves at each spatial location, said relation being a function of the blade edge separation.

The formulation of such fringes in terms of waves diffracted by boundaries formed by object edges, cylindrical surfaces and the like gives a much clearer understanding of the means by which fringes move as the boundary separation changes.

My realization the the Diffractographic invention can be described in terms of an interference pattern produced by coherent interaction of waves diffracted by each boundary has indicated to me that other arrangements could be devised to produce diffraction waves which would interact to form interference patterns whose fringes would move in such a manner as to allow changes in separation of members to be determined. Several examples will be described, and the term "diffraction wave producing means" is used herein to describe the general class of such arrangements, whether they employ one, two, six, or any other number of edges or their equivalent.

A typical diffractographic example is shown in FIG. 1. Here a gas laser 1, emits a uniphase monochromatic plane wave of wave length $\lambda$ which is incident on, and diffracted by, diffraction wave producing edges 2 and 3 of adjacent objects 4 and 5 forming a slit aperture of width, $w$. Since the objects are separate members, displacement of one relative to the other may freely occur, causing changes in the intensity distribution of "Fraunhofer" type interference pattern 6 formed in the focal plane of convex lens 7, of focal length $R$. The interference pattern 6 is formed about axis 8 extending the direction of the propagation of the electromagnetic radiation from source 1. In this embodiment, axis 8 is in alignment with electromagnetic radiation incident upon edges 2 and 3, and furthermore, the interference pattern is symmetrical about axis 8. Lens 7 is optional. Where the lens 7 is utilized, the angle $\theta$ and the distance $R$ are measured from the axis of symmetry of the lens. Where lens 7 is not utilized, and in this event $R$ must be much greater than $w$, $\theta$ and $R$ are measured from the gap between edges 2 and 3. When the lens is used, it is placed in close proximity to edges 2 and 3. Measurement of changes in the pattern provides values related to displacement as described below:

Virtually all intermediate optics texts give the intensity distribution of such a pattern, which is $$I = \frac{I_o}{R^2} \frac{\sin^2 B}{B^2} \qquad (1)$$

where $I_o$ is the intensity at the pattern center, and $$B = \frac{\pi}{\lambda} w \sin \theta \qquad (2)$$

The pattern has therefore a decaying sine squared distribution with zeros of intensity of "minima" everywhere $$w \sin \theta = n\lambda \qquad (3)$$

where $n$ is a non-zero integer.

In the region of small angles $\theta$ where $\sin \theta = \theta$, equation (3) can be written $$x = \frac{nR\lambda}{w} \qquad (4)$$

In this small angle region, the fringes are linearly spaced with spacing $$s = \frac{R\lambda}{w} \quad (5)$$

and we can define for them a spatial fringe frequency (eg. fringes/mm $$f = \frac{w}{R\lambda} \quad (6)$$

Now suppose a force is applied to member 4 of FIG. 1 causing it to be further displaced from member 5 by an amount $\delta x$. This will cause $w$ to increase by the amount of the displacement, producing changes in the frequency of the pattern fringes which are linearly related in the small angle region to changes in separation by the equation:

$$\delta x = (w'-w) = R\lambda(f'-f) \quad (7)$$

Two other relations can also be used, written here for the case of small angles $\theta$, $$\delta x = nR\lambda \left[\frac{1}{x'} - \frac{1}{x}\right] \quad (8)$$

and $$\delta x = R\lambda \left[\frac{1}{s'} - \frac{1}{s}\right] \quad (8)$$

Before continuing, it is useful to consider the following equation and its variations $$N_{\theta_d} = \frac{\delta x \sin \theta_d}{\lambda} \quad (10)$$

Figure 3:
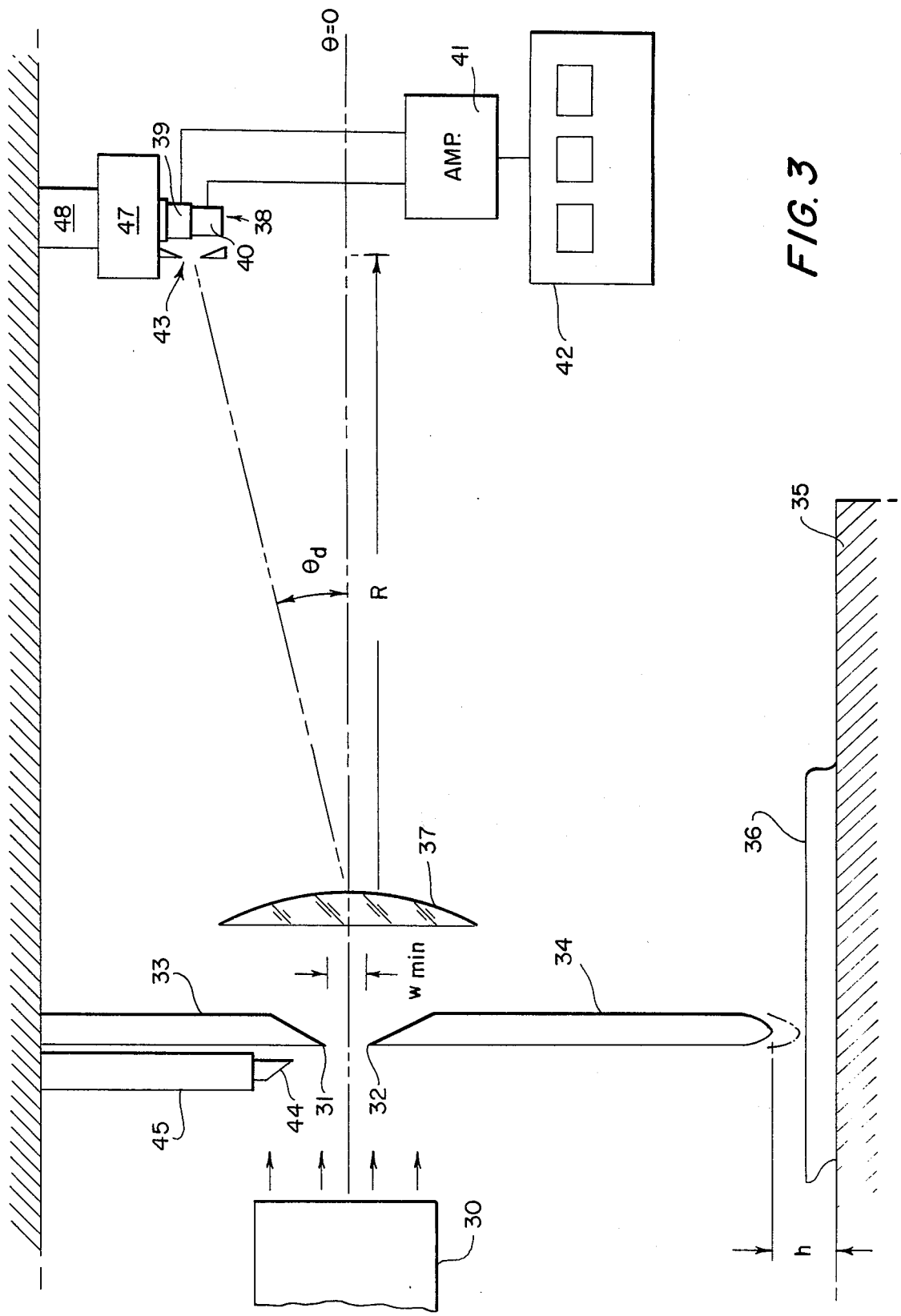
FIG. 3 is a diagrammatic side elevation view of a displacement measuring system according to the invention employed in a thickness gage and utilizing a detector located at a fixed angle.

This equation is derivable from equs. 2, 3 and 7 and predicts the number of fringes (integer or fractional) passing a particular angular location $\theta_d$ for a given displacement $\delta x$. $N_{\theta_d}$ is therefore a measure of the fringe count sensitivity to displacement, and is a useful criteria in ascertaining performance of count type detection systems such as illustrated in FIG. 3 below.

Several outstanding characteristics relevant to practical applications are apparent from the equations. First, is their evident simplicity. Change in separation is determined from a measured quantity $s, f, x,$ or $N_{\theta_d}$ and two essentially constant quantities, $\lambda$ and R, or $\lambda$ and $\theta$. Thus a very high, long term accuracy is implied together with a freedom from non-linearities, drift and other electrical fuctuations as experienced in other displacement sensing systems. The key point is that wavelength is providing the measurement base, and with laser sources this is a quantity known with great precision.

A second consideration is that the distanct R, acts as a kind of inertia-less optical "lever arm", greatly magnifying the displacement. The great advantage of this optical lever arm over those devices heretofore constructed using pivoting mirrors and the like is that there are no moving parts and no critical angular relationships between light source and edges. For practical use, particularly in self-contained transducers, the advantages gained are all important.

I have found in practice that, using low powered and inexpensive He-Ne laser sources, changes in separation of 0.1 to 0.5 microns are generally measureable by the invention over displacement ranges of several millimeters using the unaided eye and ordinary linear measuring instruments. Using simple photodetection means, better than 0.01 micron has been achieved. From theoretical considerations, considerably better performance is possible but thermal gradients in the surrounding air usually cause unwanted movements of the interference pattern fringes which limit sensitivity to the values above. Such thermal errors can be minimized by observing movements of higher rather than lower fringe orders, however.

The range of separation measurement is limited by the minimum distance $w_{min}$ and the fringe resolution ability of the detection system used. At light wavelengths, a typical maximum measurable change in separation is 3 millimeters although displacements several times this have been measured. For example, using a He-Ne gas laser wavesource ($\lambda = 6328$ A) whose beam is expanded to 2.5 cm. diameter, thereafter converging to a focus 9 meters away, a displacement of 2 cm. has been determined using the naked eye and a vernier calipers to measure changes in fringe position. Combined with the accuracy obtainable, such ranges are outstanding. Even larger displacements can be measured if longer wavelengths are employed.

The convex lens shown in FIG. 1 may be either cylindrical or spherical, the latter focusing the pattern (ordinarily of laser beam width in the $y$ direction) to a fine line. Not only does a lens form a pattern no matter what value of $w$ is used, but the pattern formed does not move in space as the centerline between the two edges moves. This is particularly important feature in those systems where for example, a detector and one edge is fixed in space with the other moving toward or away from it (eg. FIG. 3).

Figure 5:
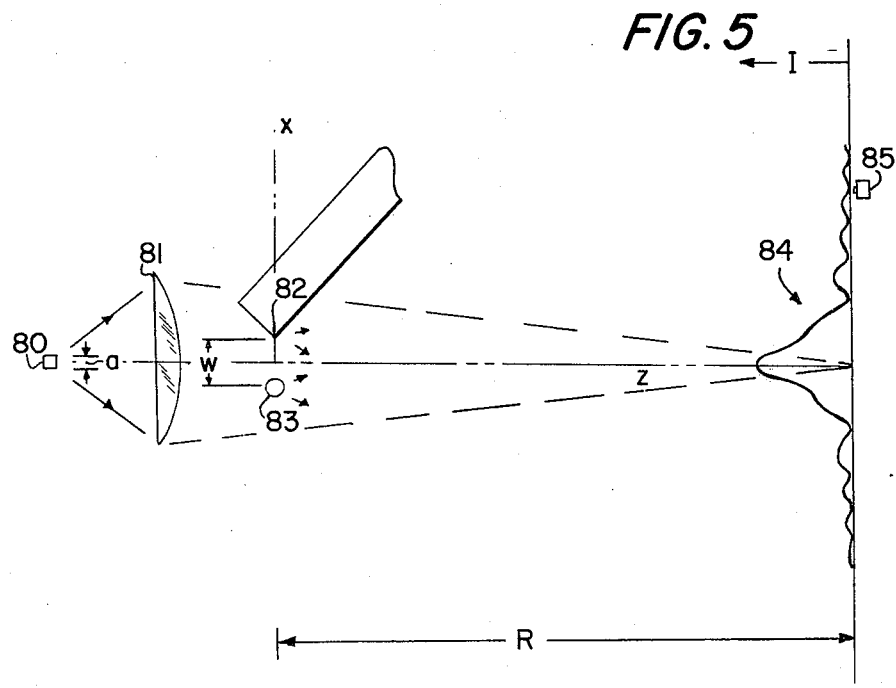
FIG. 5 is a diagrammatic side elevation of an embodiment of the invention utilizing diffraction of waves from a single boundary of an object and waves diffracted by two boundaries of an object.

The lens may equivalently be located between source and edges, and diverging, as well as plane, waves may be incident on the lens, (which may itself be a system of lenses). When the lens is between source and edges, the distance R in the above equations becomes the distance from the slit to the focus. An example employing these variations is shown in FIG. 5.

Figure 4:
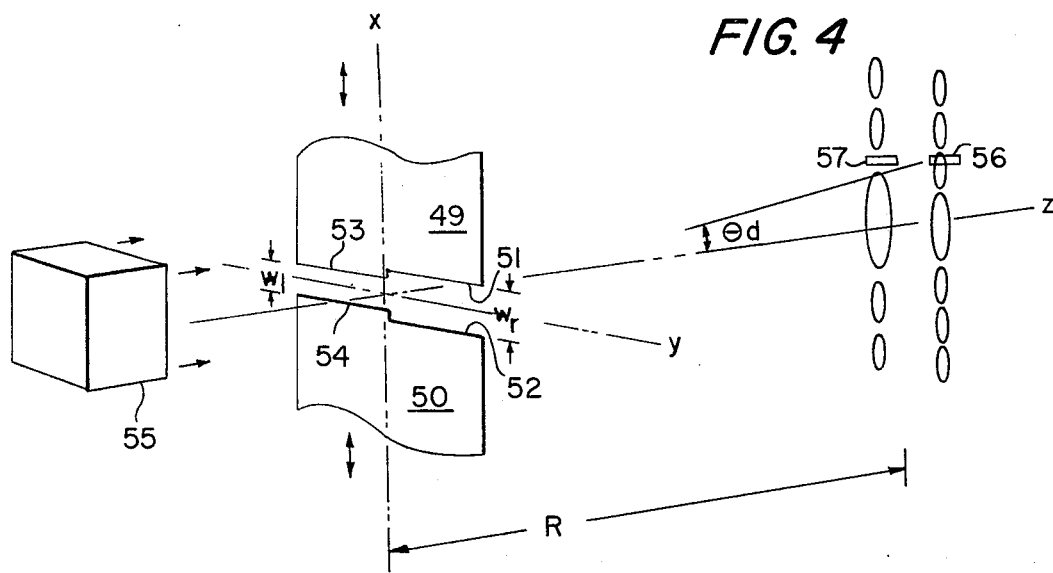
FIG. 4 is a diagrammatic perspective side view of an embodiment of the invention including means for multiplying the number of counts produced for a given displacement and obtaining displacement direction information according to the invention.

If plane, or nearly plane, waves are incident on the edges, no lens is required to form a Fraunhofer interference pattern, as long as the distance R from wave producing means to the observation plane is much greater than $w$. This situation is illustrated in FIG. 4 and other examples, and is almost always used in laboratory experiments.

While Franuhofer type diffraction is definitely preferred because of the simple equations relating measurable pattern quantities to slit width, the technique is not limited to this case. In particular, it is noted that nearly Fraunhofer conditions will produce quite useable patterns of a similar nature. While the minima are not zeros of intensity in this case, their change in position effectively indicates displacement using the equations above (within a negligibly small error in most cases.)

It should be further noted that by utilizing two linear, parallel edges to form diffraction waves, the maximum amount of incident light is diffracted in a single direction, thereby maximizing intensity changes in the interference pattern resulting from changes in separation between the members whose edges form the aperture.

While the invention may use any suitable electromagnetic wave source, there are some definite preferences therein. First it is preferred in general that light or near infra-red sources be used, due to the availability of suitable detection means. In addition, the short source wave length may result in higher displacement sensitivity (though less range) in some apparatus configurations.

Second, it is generally preferred that the wave source be monochromatic and of constant known phase relation at each diffraction wave producing means. In practice, the degree in which this condition is met determines the number of fringes which can be reliably observed — a factor related to both range and sensitivity of displacement measurement. Generally speaking, laser sources and particularly gas lasers, give excellent performance in both respects, with narrow strip light emitting diodes (LED's) having sufficient monochromaticty and spatial coherence for some applications.

While it is preferred that discrete wavelengths of narrow bandwidth (eg. $\Delta\lambda < 10$ A) be employed, two or more such wavelengths may be used simultaneously, if the diffraction patterns produced can be separated — for example by use of filters or the color distinction of the eye. In fact, the angular positions at which patterns of each wavelength have corresponding minima represent unique separations and may themselves be observed to determine same.

In a related manner, the method of exact fractions often used in gage block interferometry can be employed here. An unknown value of $w$ is determined by noting the fractional fringe orders existing at a given angular location for several different wavelength patterns. Alternatively, more than one angular position situation can be monitored with a corresponding reduction in the number of wavelengths required to determine $w$ to the same accuracy level.

Suitable diffraction waves can be produced by the edges or other boundaries of objects composed of virtually any material, and whose size may range from the largest of members to the thinnest of foils. To date, displacements of everything from large concrete structural members to tissue paper strips have been measured using the invention and this almost universal applicability has been responsible for much of the technique's success.

Opaque solids are not the only materials which can create boundary diffraction waves, however. For example displacements of a mercury minuscus in a glass tube can be measured using the invention. In addition a phase discontinuity in a transparent liquid or solid may also produce a suitable diffraction wave.

The shape of the diffraction boundary may in some cases influence the intensity distribution of the diffraction wave, though not in general the fringe locations produced due to its interaction with other waves. A wide variety of boundary shapes have been used, from razor blade edges to one meter diameter cylindrical surfaces.

If edges or other diffraction wave producing means located in two adjacent members are disposed along radii of a circle, a small angle $\phi$ apart, a change in their separation, $w$, is equal to $r\Delta\phi$, where $r$ is the radius of the circle. Thus angular displacements $\delta\phi$ may also be measured using the invention and several important application areas result, among them shaft angle encoding and torque sensing.

An equally important angular displacement application is the sensing of angular displacements of a swinging arm balance. This type of scale is widely used in commerce and the disclosed invention is considered an ideal measurement system, being highly accurate, quasi-digital, and of extreme long term stability, implying less frequent calibration. Another interesting application is the measurement of clock pendulum displacements.

The ability to utilize the actual boundary of a test member as a diffraction wave producing means such that a change in separation between it and another diffraction wave producing means whose position is known can be monitored is a tremendous advantage, since no contact need be made with the tested member. For the vibration analyst, for example, such non-contact operation is a virtual necessity.

Since production of the interference pattern is essentially instantaneous, stroboscopic illumination may be used. For example, using a modulated laser source, patterns corresponding to vibrational amplitudes of objects may be "frozen" at a particular point in the vibrational cycle, or observed in slow motion.

A wide variety of detection means may be used to determine the interference pattern variables from which changes in separation are obtained. Generally speaking there are two types, those which observe the movements of fringes, and those which determine fringe spacing, or spatial frequency, by scanning the pattern or comparing it to a pattern of known frequency. Where a material boundary forms the diffraction wave producing means, the former type of detection involves a trade-off between the decreasing fringe intensity as a function of angle predicted by equation (1), and the increased fringe movements for a given change in separation occuring at such larger angles $\theta$. In the latter type of detection however, it is almost always those fringes lying near $\theta = 0$ which are used, since they are the most intense.

When visual observation of fringes is used, it is generally preferable to determine changes in the position of a particular minima, a change $\alpha x$ (ie. $\Delta\theta$) in the eighth order minimum, for example. In practice it is preferred to make such measurements across the pattern, determining the change $2\Delta x$ since this corrects for any alignment shifts during the experiment between the incident wave axis and edges and minimizes the effect of "z-factor" which is usually assumed not present (see FIG. 2).

Visual measurement error usually depends much more on the eye's ability to detect and locate one or more minima whose positions are monitored, than on the linear measurement of their movement or spacing. Light source intensity should be maximized and ambient lighting minimized to aid such detection. In addition, R should be adjusted (for a given $\lambda$ and $w$) such that fringe spacing is such that the fringe minima region occupies most of the eye's field of view. If R cannot be increased to do so, magnifying optics may be used. For example, a simple 3x magnifying glass gives equivalent results to changing R by a like amount. While such magnification is usually done of the pattern displayed on a ground glass screen, it is also possible to magnify the live pattern before it hits the screen — at least in those cases where slit width is small enough such that no appreciable fresnel diffraction effects occur. For example a cylinder lens of focal length 44 mm placed 1 meter from a slit of 0.2 mm width expanded the central maximum of said slits diffraction pattern 10 times on a screen R = 2 meters from the slit. This gives therefore an additional 10x magnification with no parallax.

Within the small angle region, fringe movement for a given $\delta x$ increases linearly with $x$, while fringe intensity decreases as $n^2$. However, the eye's resolution increases at lower brightness levels, so the $x$ position one chooses to view the fringes movements should make little difference. In practice however, it is almost always easier to measure by the unaided eye large movements of higher ordered (and therefore less intense) fringes.

To illustrate the above points, a test conducted using a 13 mw laser source ($\lambda = 6328$ A) and a vernier calipers to measure the value $2 x_n$ at a distance R = 2 meters gives repeatability errors of 0.1 micron when the sixteenth order minima is used to determine the width of a 0.4 mm slit, versus 0.3 micron when the second order is used. R is then increased to 5.5 meters, at which position fringe spacing at this slit width seems better for unaided visual detection. Repeatability error using the seventh order (ie. roughly the same $x$ value) drops to 0.06 microns — a seemingly optimum value.

Interference patterns may be recorded on film or other media for subsequent data taking by eye, or using microdensitometers or the like. Such records are of considerable use particularly in laboratory experiments, for several reasons.

First, time exposure can make up for low wave source power, allowing otherwise faint fringes to be easily seen and their positions analyzed; second, analysis of fringe positions is often easier from a film record than from the "live" interference pattern. Finally, the ease in which interferograms may be taken, on Polaroid film, if desired, facilitates the recording of experimental data.

When a sensitive photodetection means is used, rather than the naked eye, the linear measurement and detection error terms become more nearly equal. Consider the system repeated in FIG. 1 by photodetector 9, moved by micrometer 10, through pattern 6, said photodetector signal feeding amplifier 11, and readout on voltmeter 12. Using a 2 milliwatt He-Ne gas laser wavesource, a UDT type PIN 20A detector, an Intersil model ICH 8500A amplifier, and a precision Boekeler micrometer, both detection and linear measurement errors are so small as to allow determination of changes in $w$ less than 0.015 microns over a wide range of $w$ values. In operation, the detector is scanned over the region $2x_n$, typically 1 to 2 cm long, with the micrometer indicating the linear movement between minima locations indicated by the voltmeter needle.

When a detector located at some fixed angle is used to detect the interference fringes passing said angular position with a change in $w$, no linear measurement error occurs, since the scanning motion is provided by the measured quantity itself. In this case it is useful to rewrite equation (1) as $$P = \frac{I_i l d \lambda \sin^2(\frac{\pi}{\lambda}\sin\theta\, w)}{R \sin^2\theta} \quad (11)$$

where $I_i$ is the intensity incident on edges 2 and 3, $l$ is the length of the slit in a direction normal to the plane of the drawing of FIG. 1 (herein referred to as the "$y$" direction) and where P is detected power by a detector of small width $d$ in the diffraction of $x$ direction whose length in the $y$ direction is sufficiently long to intercept all the pattern in that direction. This latter consideration is very often the case when laser sources are used, and accounts for the 1/R dependence in equation (11), rather than the $1/R^2$ of equation (1).

It is apparent, if the detector is located at a fixed angle $\theta$, it will produce a simply interpretable output signal proportional to $\sin^2 w$, as $w$ changes. This output signal can therefore be used to determine changes in separation usually by counting the number of fringes of fractions thereof passing the detector. A very simple apparatus having a linear and "quasi-digital" electronic output results.

In most systems, the detector width, $d$, is fixed a priori, and it must be small enough to resolve the fringe spacings resulting from the largest slit width expected. Therefore in obtaining a given range ($w_{max} - w_{min}$) it is $w_{max}$ which effectively determines $d$, R being fixed as is usually the case. Since it can be shown that the detection error in many systems becomes large at very small $w$ values when $d$ is so fixed, it is therefore preferable to minimize the ratio $w_{max}/w_{min}$ in order to have the least detection error for a given range. In other words, if one must fix detector width, it is better to obtain a displacement range of 1 mm for example using $w_{max} = 1.1$ mm, $w_{min} = 0.1$ mm than by using $w_{max} = 1.01$ mm, $w_{min} = 0.01$ mm. Because of these considerations, systems operating over a large range may benefit by having adjustable detector widths or a plurality of separate switchable detectors of different width, or optical means to expand the pattern portion reaching the detector face.

During the course of experimentation with the systems described above, I found that new and useful asymmetrical interference patterns could be generated which would be simultaneously proportional to separation in two orthogonal directions. I have coined the name "$z$ factor" to describe these patterns and the devices based thereon.

Figure 2:
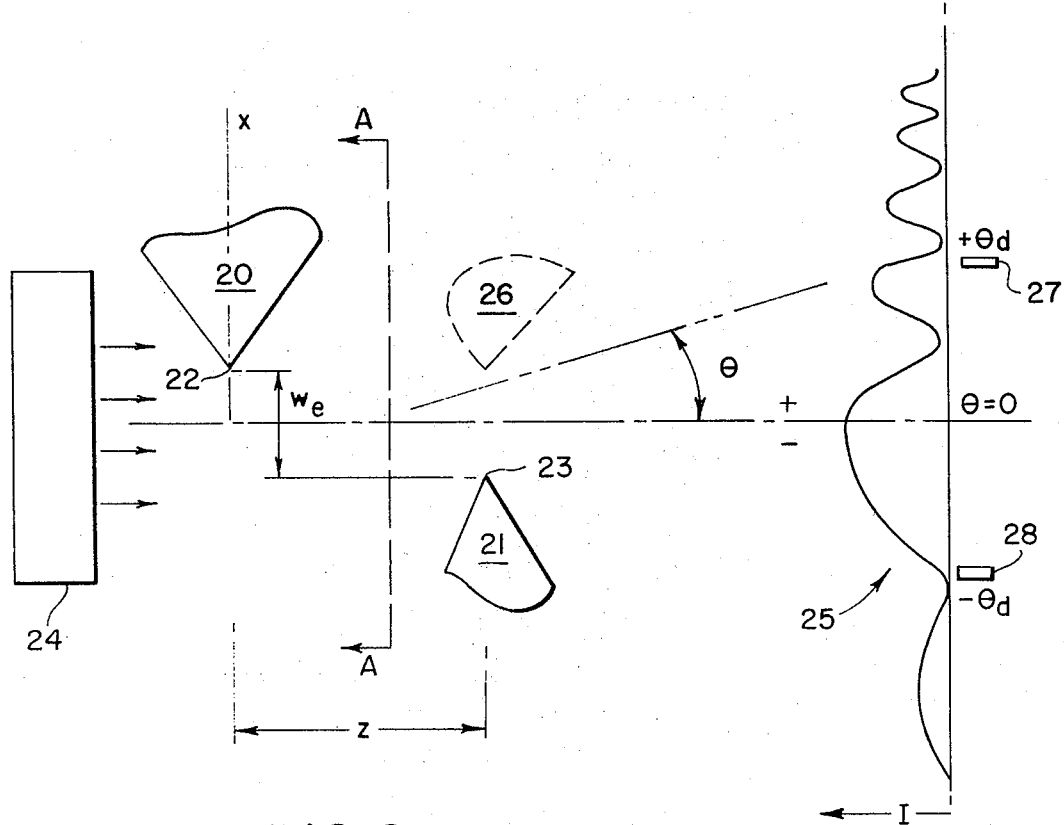
FIG. 2 is a diagrammatic side elevation view of an alternative embodiment of the invention in which the diffracting boundaries are displaced in two orthogonal directions.

Shown in FIG. 2 is the basic $z$ factor arrangement, which differs from FIG. 1 in that the objects 20 and 21 comprising the two diffraction wave producing edge boundaries 22 and 23 required by the invention, are separated by a distance $z$ in the direction of propogation of incident electromagnetic radiation as well as by an effective separation $w_e$ in the $w$ direction normal to the direction of propogation of incident radiation. When the edges are illuminated by plane waves from gas laser 24, an asymmetrical interference pattern, 25, is produced.

I have found that an equation corresponding to equation (2) can be written for this situation, $$\beta = \frac{\pi}{\lambda} w_e \sin\theta + \frac{\pi}{\lambda} z(1 - \cos\theta) \quad (12)$$

where minima of intensity occur whenever $\beta = \pm \pi$, $2\pi$, $3\pi$, etc. This equation reduces to equation (2) when $z = 0$, as required.

Analysis of the interference pattern intensity distribution as a function of $\theta$ therefore allows $w_e$ and $z$ to be determined, using equation (12). This ability to determine separations in two orthogonal directions, using one laser beam and interference pattern, is a unique capability of the invention.

Two other configurations are also of interest. The first is when both object edges are on the same side of the pattern, the case when object edge 26 shown in dotted lines replaces 21. In this instance, $w_e$ in equation (10) becomes the difference in location of each edge in the $x$ direction. Note that in this case waves emanating from edge 22 at angular values greater than $\tan^{-1}(z/w_e)$ are masked by object 26, whereas in the previous case, all waves at values less than $\tan^{-1}(z/w_e)$ are masked.

For the $z$-factor case discussed above, similar relations to equation (10) are obtained by consideration of equations (12) and (7), i.e.

$$N_{\theta_d} = \frac{w_e' - w_e}{\lambda}(\sin\theta) + \frac{z'-z}{\lambda}(1-\cos\theta) \quad (13)$$
$$= \frac{\delta x (\sin\theta)}{\lambda} + \frac{\delta x}{\lambda}(1-\cos\theta)$$

Where $\delta x$ and $\delta z$ are assumed to be monotonically increasing or decreasing.

When $\delta z = 0$, (11) becomes $$N_{\theta_d}(w_e) = \frac{\delta x \sin\theta}{\lambda} \quad (14)$$

and for $\delta x = 0$, $$N_{\theta_d}(z) = \frac{\delta z}{\lambda}(1-\cos\theta) \quad (15)$$

Equation (14) is obviously the same as (10) and this means that no matter how asymmetric the interference pattern is, due to non-zero $z$ values, the number of fringes passing an angular position $\theta_d$ for a displacement $\delta x$ is the same. This is of considerable utility in practice, since small values of $w_e$ may be used (eg. 0.1 mm) even though the objects whose edge waves are employed (eg. 20 and 21) may be separated by considerably larger distances (eg. 10 cm). Thus, clearance in the $z$ direction may be provided between adjacent members, reducing mechanical problems and allowing, if desired, one member to be inside a controlled environment chamber while the other is outside. This latter characteristic is of use in studies on shrinkage, thermal expansion, creep and the like, since an edge of the actual test member in the environmental chamber may be used.

Another situation in which sensing of displacements, $\delta x$, between object edges $z$ apart may be used, is determination of angles. For example, when $\delta x$ is resolved using the invention to 0.1 micron at a $z$ separation of 10 cm, a $10^{-6}$ radian angular measurement results. This is a performance equalled only by expensive, bulky, and difficult to use autocollimator systems.

Note that it is essentially equivalent to the combination of edges 20 and 26 to locate a flat mirror in plane A—A, midway between 20 and 26, redirecting waves back onto edge 20. In this case the angulation of the mirror relative to the incident laser beam determines $w_e$, and such angulation may therefore be measured with the same accuracy quoted immediately above. Note that the angulation may also be provided by index of refraction gradients: and such gradients themselves may be measured from the change in the interference pattern produced.

Finally, note that $z$ separations can be used to provide clearance for the purpose of avoiding unwanted contact of edges due to overloads or other causes.

Equation (15) indicates that fringe movements related only to $\delta z$ may be produced if $\delta x = 0$. In other words a "z only" sensor of displacement may be constructed whose count sensitivity is however considerably less than the $\delta x$ case, as can be seen from comparison of equations 13 and 14 at the small angles $\theta$ usually used in practice. Range is however much improved, and separations of up to one half meter have been determined before fringe spacing became too small to allow resolution with the detection system used.

Equation 13 can be used as the basis for a device to determine displacements in both $x$ and $z$ directions using simple equipment — namely two detectors 27 and 28 located at angles $+\theta_d$ and $-\theta_d$ respectively as shown in FIG. 2. Since the value of $\sin\theta$ is positive and negative at the angular locations $\theta_d > 0$, $\theta_d < 0$ respectively, the number of fringes moving past at $\theta_d > 0$ will be $$N_{\theta_d(+)} = \frac{\delta z}{\lambda}(1-\cos\theta) + \frac{\delta x}{\lambda}\left|\sin\theta\right|$$

and at $\theta_d < 0$ \hfill (16)

$$N_{\theta_d(-)} = \frac{\delta z}{\lambda}(1-\cos\theta) - \frac{\delta x}{\lambda}\left|\sin\theta\right|$$

Since one may measure $N_{\theta_d(+)}$ and $N_{\theta_d(-)}$ representing the number of fringes passing at each detector location for the given pair of unknown displacements $\delta x$ and $\delta z$, equations (16) may be solved to give these displacements.

A practical system utilizing edges of two members as diffraction wave producing means is shown in FIG. 3. The device is a contacting type displacement transducer, employed as a thickness gage, for sheet materials and other products. This device has two outstanding characteristics; a very high range-accuracy product and a quasi-digital count type output as discussed previously in regard to equation 10. Operation of the gage is as follows:

Electromagnetic radiation of wavelength 8500 A from continuous diode laser 30, of the type described by Asaro et al. in Physics Today, March 1971, p. 42, illuminates adjacent edges 31 and 32 of members 33 and 34, the diffraction waves therefrom producing an interference pattern. Member 33 is fixed relative to a platen 35 while member 34 contacts material such as paper sheet 36 resting on the platen. Before operation, member 34 is located a distance, $h$, away from the platen, corresponding to the minimum slit width $w_{min}$. This value of $w$ usually is adjusted for convenience such that the diffraction pattern produced by the slit in the focal plane of lens 37 results in a minimum or maximum at the angle $\theta_d$ at which detector 38 is located.

While a single photodetector (such as an EG and G model SGD-100A silicon photodiode) may be used as the detector 38, it was chosen in this instance to use two closely spaced detectors 39, 40 on a common substrate, in this case a United Detector Technology type PIN Spot 2-D. When used in conjunction with differential amplifier 41, the output of this "split" photocell produces a zero crossing and change of polarity every time the intensity seen by both detector halves is the same — ie. when a maxima or minima is centered on the detector. In other words, it is slope reversals of the pattern, rather than whole fringes, which are counted.

As the contacting member is lowered onto the platen, $w$ increases to $w_{max} = W_{min} + h$ and a number of fringes, $N_{max}$, given by equation 11 pass the detector means, which generates $2 N_{max}$ polarity changes to be registered by a counter 42. If $\theta_d$ is chosen correctly for a given source wavelength, a count results every even fraction of a millimeter of displacement $\delta x$.

To perform a thickness measurement, it is only necessary to place a piece of sheet material 36 on the platen and lower the contacting member onto the sheet. The number of counts recorded is obviously less than that with no material present and the difference represents the sheet thickness.

In a typical operational example, $\sin \theta_d$ is chosen to be 0.425, which at 8500 A laser wavelength implies that a fringe will pass the detector every 2 microns of displacement, with a count every 1 microns using the slope reversal detection system above. For $h = 1$ mm therefore, 1000 counts occur, and if a sheet of paper, say of thickness 0.5002 mm. is inserted, the number of counts will drop to 499 plus some fraction. While resolution is $\pm 1$ count or 1 micron in this example, it is important to note that the fringe location accuracy of the system can exceed 0.02 microns of corresponding separation change and this intrinsic accuracy of locating the minima/maxima positions allows the fractional fringe counts to be determined where desired.

Two characteristics of this gage are readily apparent, the quasi-digital output in counts and the utter simplicity of the device with its total lack of electrical voltage or current dependent devices which can drift or go out of calibration with time. These features combined with the high resolution, large range (up to 3 mm or more in some systems), linearity and submicron accuracy provide unparalleled advantages over present techniques.

The count type detection means can also be used as a totalizing system useful in many diverse fields. As discussed above, a number of counts is registered as the slit width goes from $w_{min}$ (or max) to a value representing the variable measured. If there is therefore, some repetitive nature to the displacement, the accumulated number of counts registered after a certain number of events M, will be proportional to M times the average value of the variable over the measurement interval. Thus a load cell based on this very simple system utilized in a highway weighing platform produces a count total proportional to the total weight of vehicles passing over the platform in a given time. This information is of considerable use to highway departments and like organizations.

There are several further considerations involved in the use of count type detection systems. First, as $w$ increases, fringe spacing decreases and at some point the detector used becomes too big to resolve the fringes. This can be alleviated (for a given wavelength source) by increasing R (and therefore fringe size) or by narrowing the detector width, as is done by employing the entrance aperture slit 43 in FIG. 3. In either case, less power can enter the detector, and sensitivity drops. Thus range and resolution are traded off for any given source power/detector sensitivity combination.

A second consideration is that if a pulsed laser is used, its pulse frequency must be high enough to provide at least several pulses during the time it takes each fringe to pass the detector. In the case of diode lasers, such pulsed operation can provide greatly increased output power, though requiring more sophisticated detection circuitry, if the power available is to be taken advantage of.

Another consideration regarding the basic count type system shown in FIG. 3, is that thickness values are represented by the number of counts from the $w_{min}$ position and therefore all measurement must either start from this position (or equivalently another reference position) or a continuous up-down count must be maintained. While of little consequence in the thickness measurement system illustrated, some situations would benefit by an ability to determine edge separation at any given time, without recourse to maintenance of a continuous count. This may be accomplished using the invention by incorporating a slit mask member 44, which on command is moved down to cover the slit by actuator 45. When the actuation force is removed, the slit mask retracts, its edge forming a slit with edge 32 of member 34 and fringes sweep by the detector, producing a count signal as $w$ goes from zero to $w$ measured, at which time edge 31 of member 33 again comes into effect. The counter then reads a count proportional to $w$, from which must be subtracted $w_{min}$ to obtain the same reading as previously. Obviously, if $w_{min}$ is chosen to be zero, then the counter reading becomes directly proportional to slit width.

The main problem to date is practical employment of the FIG. 3 type single count type detection is obtaining enough light source power such that fringe movements can be easily detected using unsophisticated detectors at large enough angles $\theta_d$ to provide adequate fringe count resolution. Accordingly, it is highly desirable to have some means of increasing the counts obtained at a given angle. Discussed first are hybrid techniques in which the fixed angle detector produces a quasidigital fringe count, with any remainder or fractional fringe value determined by analog means. Thus A-D conversion and long term stability errors characteristic of analog systems are confined only to resolution of the last count.

The first technique is to simply relate detector voltage to the partial fringe position. For example, in the FIG. 3 apparatus, a single photodiode detector located at angle $\theta_d$ will provide an output voltage proportional to the changing interference pattern intensity represented by $I \approx \sin^2 [([\pi/\lambda]\sin\theta_d)w]$. This output can be analyzed to provide 1/20th fringe resolution without excessive electronic sophistication.

Another hybrid system, this time using the null balance principle, can be utilized. Referring to the operational example FIG. 3, suppose that the fraction (if any) of a half fringe resting on the detector is desired. It can be determined by applying a known voltage to actuator 47 in detector support member 48. the actuator moves detector 38 relative to the centerline of the interference pattern ($\theta = 0$). The actuator thus changes $\theta$ to an amount proportional to voltage applied to actuator 47 until the next count is just registered, and the voltage applied is proportional to the partial fringe value. Alternatively, the distance from the centerline could be kept constant and R changed to change $\theta$.

The above null balance techniques are workable, but are non-linear since the amount of angle change depends on fringe spacing, which changes with edge separation, $w$. To provide a linear system in which the same actuation signal always produces the same fractional fringe shift at the detector, three techniques may be used.

The first, and most elegant technique, is to change source wavelength a known amount. At this writing however, only a few laser sources may be accurately tuned, even over the small wavelength range required to shift a fractional fringe. Perhaps the most usable are the semiconducting diode lasers which may be tuned over a small percent of wavelength using magnetic fields or temperature changes. Of course, the index of refraction of the surrounding medium can also be changed, effectively changing wavelength, but this is even more difficult. Noted in passing however, is that unknown changes in index of refraction can be accurately measured by the invention, since they produce changes in the optical distance between diffraction wave producing means. Similarly, wavelength changes themselves may be so determined.

Another linear null balance technique is to change $w$ itself in a known manner. This can be accomplished in the FIG. 3 apparatus by using actuator 45 to move edge 44 past edge 31 of member 33 just enough to cause the detector to produce the next count. Using a voltage controlled piezoelectric translator, for example SPectra-Physics model 44 providing 0.8 microns movement per 100 volts applied, 1/100 fringe may be determined in this manner. This is equivalent to resolving edge separation to 0.02 micron in the FIG. 3 apparatus.

A third fractional fringe resolution technique is to illuminate each diffraction wave producing means with separate beams whose phase relation can be varied in a known manner causing proportional fringe shifts at the detector. For example two slightly divergent beams from a laser illuminated Michelson interferometer were used to illuminate each edge of the FIG. 3 device, respectively. As the phase relation of the two beams was changed by $\pi/2$ using the movable mirror of the interferometer, the fringe portion at the detector angle moved by one-half fringe.

A generally more preferable approach is to refrain from analog systems which imply added costs, A-D conversion inaccuracies and, in the null balance case, much slower response. One technique which can electronically double counts from either single or split (slope sensing) detection systems is to cause counts to occur whenever a given median voltage level is reached. Thus counts are produced on both up and down ramps of the detector system output signal (rather than just at zero values). Source power and detector sensitivity must be controlled to within approximately 10 percent for this to work, however, The technique above utilized with a split detector system can achieve a count sensitivity equal to 4 N $_{\theta_d}$ and this is probably the limit for practical quasi-digital detection. A means for multiplying counts even further is described below.

As can be seen from equation 10, count sensitivity depends on $\theta_d$ and displacement, not separation. Thus if multiple pairs of diffraction wave producing means are used, each displacing the same amount and each associated with a separate detector located at the same angle $\theta_d$, each detector system will have the same count sensitivity. However, if each pair of the diffraction wave producing means has a different initial separation, $w$, the count signals from each detector will not be generated at the same time. Thus with proper adjustment of the various $w$ values, the signals from the slit pairs can be phased such that a count occurs from a different pair each $1/k$ of a fringe (or half fringe if slope reversal detection is used) where $k$ is the number of pairs of diffraction wave producing means used.

A particularly simple and useful example of the foregoing is shown in FIG. 4. Here only two sets of diffraction wave producing means are employed, in this case opaque members 49 and 50 with a set of edges 51 and 52 a distance $w_r$ apart, and a set 53 and 54, $w_1$ apart. RCA type TA8391/LOC diode laser, 55, pulsing at 100 KHZ with 17.5 milliwatts average power at 9000A wavelength essentially provides quasi-continuous illumination to each set of edges, producing two parallel diffraction patterns, one from each slit. As mentioned previously, detectors 56 and 57 (such as Hewlett-Packard type 58082 silicon photodiodes) located at the same angle $\theta_d$, each see an intensity proportional to $\sin^2 [\pi/\lambda]w \sin \theta)$, as displacement occurs. If the slit width $w_1$ is different from $w_r$ by an odd multiple of $\lambda/2 \sin \theta$ then the output electrical signals from each detector are of equal amplitude but 90° out of phase. Known electrical circuitry and logic for handling such phase quadrature signals can then provide up to 4 times the counts of a single detector and also provide a signal indicating displacement direction which is essential to many applications. This multiplier technique can also be used with the slope sensing detection system shown in FIG. 3 and in that case two times more sensitivity results. For a given $\delta x$, 8 N$_{\theta_d}$ counts are therefore obtainable with this simple system and in the FIG. 3 apparatus this implies quasi-digital resolution to 1/4 micron. This is truly outstanding. In fact, it appears that using standard circuitry, up to 1/100th fringe resolution can be obtained if four slits of different width are used such that the output signals from detectors located at angle $\theta_d$ for each are phase such that a 0, 90°, 180°, and 270°relationship exists.

A simpler device than that illustrated in FIG. 4 may be built using the z-factor arrangement of FIG. 2, with the detectors 27 and 28 located at the same positive and negative angles $\theta_d$ respectively, as shown. In this case, each detector has the same count sensitivity N$_{\theta_d}$ to changes in $w_e$ (see equation 13) but their output signals are out of phase by $(2\pi z/\theta(1-\cos\theta))$ from equation (10). Thus if $z$ is adjusted to be equal to $\lambda/[4(1-\cos \theta)]$, or an odd multiple thereof, a 90°phase shift in detector signals is achieved. in the example of FIG. 3, where $\sin \frac{1}{4} = -0.425$, $\cos \theta = 0.905$ and $\lambda = 8500A$, $z$ would be 3.58 microns (or an odd multiple) to achieve this condition.

By using z-factor to accomplish the phasing, two advantages accrue over the FIG. 4 device. First, the device is much easier to construct, since only one pattern need be produced, and the requisite $z$ separation to accomplish the phasing requires less exacting tolerances in most cases. Second, the z-factor type is twice as efficient in its use of wave source power, since it uses both sides of a single pattern.

It is equivalent to use $z$ factor, rather than $w$ differences in the two sets of edges illustrated in FIG. 4 to accomplish the requisite phasing.

As mentioned above, resolution and accuracy increase with fringe intensity, all other variables held constant. However, there are certain limiting factors which mitigate against simple increases in wavesource power or detector sensitivity, at least beyond certain levels. For example, for both gas and diode lasers, 10 milliwatts is roughly the maximum average power obtainable at moderate cost, and $10^{-13}$ watts the minimum reliably detectable power using moderately priced means. These values are actually quite good, but even their cost is too much for some applications. Thus it is desirable to have other means to increase fringe intensity.

The first technique is to use a lens located between source and edges to form the interference pattern, thereby increasing the power density at the edges such as utilized in FIG. 5. In fact, a lens can be used to focus radiation directly onto an edge, though this results in more complexity and much less range.

A second technique, alluded to above, is to increase the number of diffracting edges or other boundaries composing each diffraction wave producing means. For example, consider FIG. 5, wherein a light emitting diode or LED, 80 of very small dimension $a$ (eg. $a = 0.02$ mm), emits radiation of means wave length $\lambda$ which is collected by convex lens 81 and converged so as to illuminate the boundary formed by object edge 82 and small diameter wire 83, forming a Fraunhofer interference pattern 84 in the image plane of the lens a distance $R_1$ from the plane of the edge and wire.

With edge 82 not in place, a typical wire interference pattern is produced, much like that of the gap in FIG. 1, except in the region near $\theta = 0$. However, with edge 82 in place, coherent interaction occurs between waves diffracted by edge 82 and the wire boundaries and an interference pattern is formed proportional to the edge-wire separation, $w$.

Two sets of fringes, therefore, exist in a sense: a stationary set due to interaction of the waves from the wire boundaries whose separation is fixed, and a moving set formed by interference between the stationary set and the diffraction wave from the test object edge. To optimize performance when an off-axis detector 85 is used, the detector is located at a secondary maximum of the wire pattern, and the incident illumination field adjusted such that at this chosen location the amplitude of waves diffracted from edge 82 equals the sum of amplitudes diffracted by the wire edges. In this manner contrast of the moving fringes is maximized.

Wires are but one example of diffracting objects whose boundaries can serve as a diffraction wave producing means in the FIG. 5 arrangement. For example, if the wires are instead transparent glass or plastic fibers, equally usable patterns result. In a similar manner, amplitude and/or phase diffraction effects from translucent fibers or due to scratches or undulations in transparent glass plates may be used. For example a small linear scratch in a microscope slide functions admirably when light waves are employed. It will be clear, of course, that such scratches, undulations, and the like discussed throughout this specification can be used as a means of producing a diffraction wave in the practice of the invention.

Clearly, the wire in FIG. 5 could be replaced by a diffraction wave producing means employing a larger number of edges. However, little utility results because the member measured has but one usable edge and it becomes increasingly difficult to equalize its contribution in order to obtain good fringe contrast.

When it is appropriate to attach a diffraction wave producing means to an object, as in the construction of self-contained transducer devices, then much more flexibility results and equal number of diffracting boundaries may be used in each diffraction wave producing means. For example, consider FIG. 6, where two two-edged diffraction wave producing means are employed, in this case slits 100 and 101, of equal width $b$, in opaque wall members 102 and 103, connected by flexible, opaque bellows type mask, 104.

On illumination by incident laser beam 105, a set of classical Youngs interference fringes 107 are formed, in this context treated as the result of interaction of four boundary diffraction waves, two from each slit. By locating off-axis detector 106 at a position corresponding to a maximum of an individual slit pattern 108 (dotted lines) or within the central maximum of the individual slit pattern, a maximum fringe intensity results. The fringes moving past detector 106 with changes in separation $w$ have twice the amplitude and therefore four times the intensity as those produced by two edges alone, for example in FIG. 3. This much appreciated additional intensity is obtained with very little additional complexity. In fact, if the distance, $c$, from slit to mask edges equals $b$, then the mask may be dispensed with and a pair of three equi-spaced edge diffraction wave producing means result, with a corresponding nine-fold increase in fringe intensity over the FIG. 3 case.

The concept of increasing the number of edges effective in an electromagnetic wave field, such as a laser beam, of given width and intensity, reaches its limit when a diffraction grating with a large number of boundaries is employed as a diffraction wave producing means. Consider a practical example illustrated in FIG. 7.

Here, a 200 line per millimeter grating segments 120 and 121 of width $w_g = 0.2$ mm and photodeposited on glass, are employed, located in members 122 and 123, respectively. The total number of edges effective is therefore 160 as each line is composed of two edges and each grating has 40 lines. A detector 124 is located in the center of a first order 125 of an individual grating pattern 126 (dotted lines) ie. at $\sin \theta = 0.18$ when diode laser beam 126' with a wavelength of 0.9 microns is used.

Just as in the previous examples, a moving set of fringes 127 (solid line) passes detector 124, this time with 6400 times the intensity provided by the FIG. 3 version. A considerable saving in wave source and detector system costs results. When such gratings are provided on glass or other stable substrates, long term performance remains virtually as good as the other systems described above.

Figure 7:
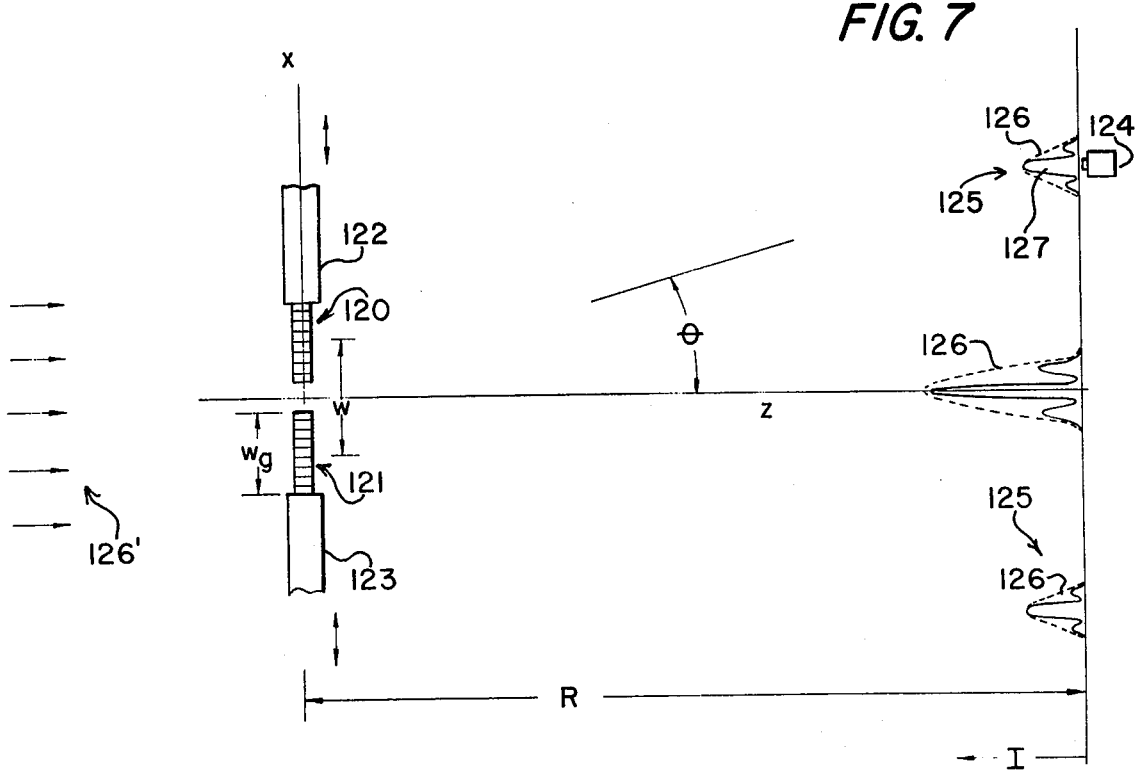
FIG. 7 is a diagrammatic side elevation view of an embodiment of the invention using diffraction wave producing means comprising a diffraction grating.

The FIG. 7 device obviously cannot utilize a separation value less than $w_g$. Such values may however be used, if the gratings are placed side by side in the $xy$ plane, rather than in-line as shown, and suitable optics used to combine the waves from each grating.

Figure 6:
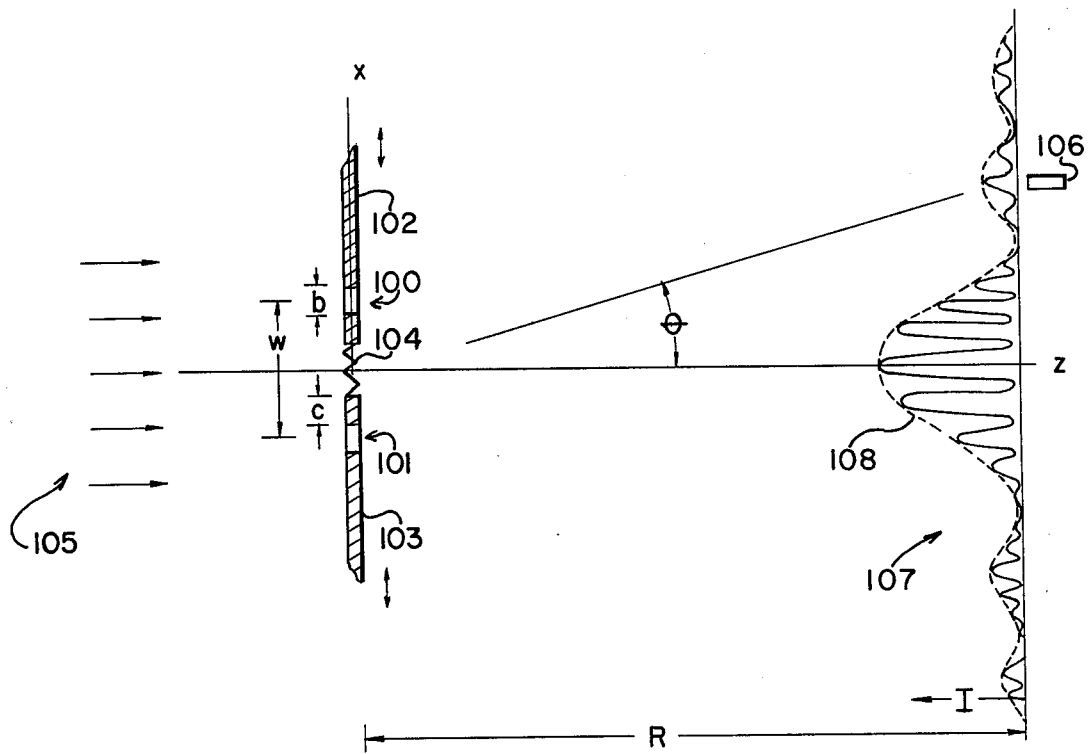
FIG. 6 is a diagrammatic side elevation view of an embodiment of the invention using diffraction wave producing means formed by two edges comprising the boundaries of a slit in an opaque wall member.

The same fringe movement sensitivity for a given change in separation is obtained with the multi-element diffraction wave producing means described in FIGS. 5–7 above, as in the single boundary diffractographic case (equation 10). In addition, the z-factor arrangement, whereby the diffraction wave producing means are spaced in two directions, may be used in the FIGS. 5–7 apparatus as well. Thus two detectors each at the same angle $\theta_d$, can be used to produce signals in phase quadrature just as discussed relative to FIGS. 2 and 4.

As noted previously, range of displacement measurement has been limited by detection problems associated with resolution of the very fine fringes produced at larger separations, $w$. In practical terms, the maximum range is a few centimeters at best and this is hardly sufficient for displacement measurement of machine tool carriages, liquid levels and the like. Disclosed here however, is means by which easily measurable small separations $w$, may be repeated, thereby providing the required long distance capability.

Figure 8:
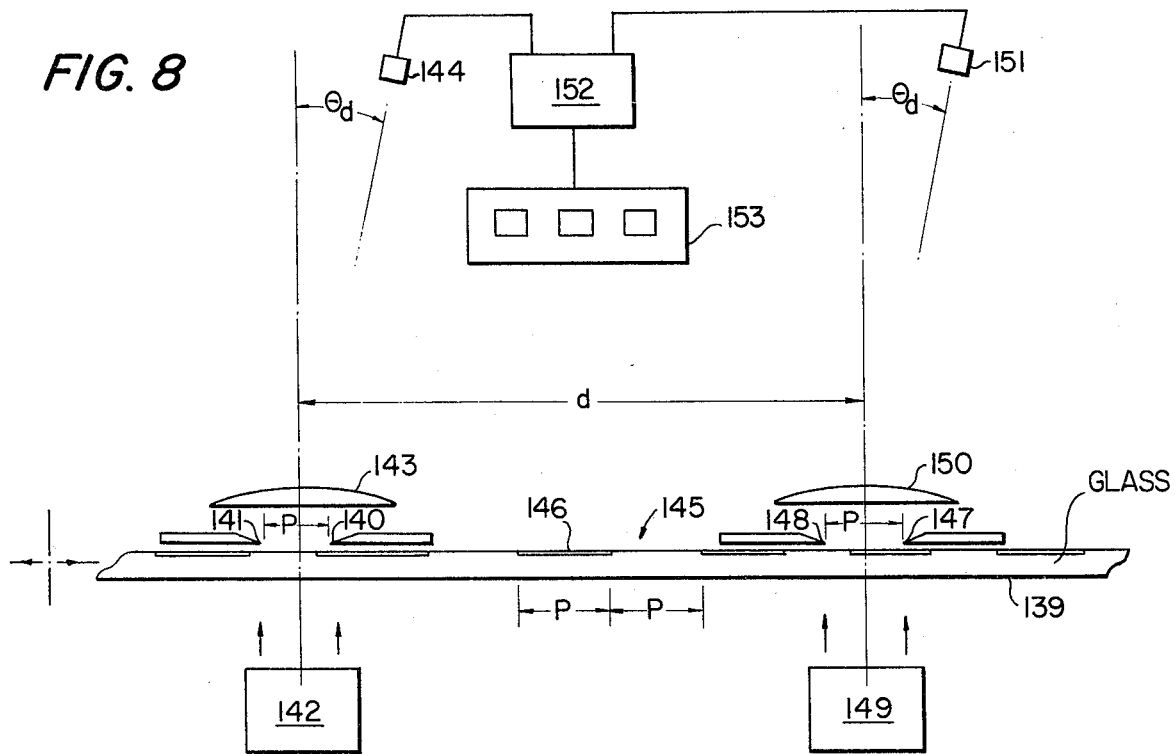
FIG. 8 is a diagrammatic side elevation view of an embodiment of the invention including means for extending the range of measurable displacement.

FIG. 8 illustrates one method of achieving quasi-digital displacement transduction using periodic repetition of edge boundaries. As shown, transparent glass plate 139 contains a periodic array of clear and opaque strips each of width P, of the same form as the common Ronchi ruling. The spacing P is coarse, (this is determined by the minimum detectable fringe spacing of the detector system employed) and is typically 1 mm.

Positioned directly above member 139 are two adjacent members whose edges 140 and 141 form a slit, which is of width equal to the array period, P. However, the diffraction pattern produced using cw or quasi-cw Diode laser 142 and lens 143 in general corresponds to that of the slit formed between either edges 140 or 141 and an edge of an opaque strip on member 139. Thus, movements of member 139 relative to the lens center line produce changes in slit width and therefore counts from photodetector 144 located at angle $\theta_d$ and of the same type as discussed in FIG. 3.

As is apparent from consideration of the diagram, slit width will be the maximum value P, when a clear strip such as strip 145 of member 139 just corresponds to the space between edges 110 and 111. As movement occurs, slit width decreases to zero, corresponding to an opaque strip such as strip 146 of member 139 and reopens again. Thus the detector continues to see detectable fringes even if the movement of member 139 is several meters. To obtain a phase quadrature signal from which movement direction may be obtained, it is necessary to use two such stations (of the type represented by items 140 and 141–144) each with the same detector angle $\theta_d$, but located at diffrent positions along member 139 such that their detector outputs are 90° out of phase with each other.

There are several considerations involved in the use of this system. First, when $w$ approaches zero, spurious signals can be produced due to a variety of reasons, the main one being the small z separation between member 139 and edges 140/141. Thus, it is generally preferable to use two or more separate stations, arranged relative to member 139 such that only one has a zero slit width situation, at any given instant.

For example, consider the station II composed of edges 147 and 148, laser 149, lens 150 and detector 151 located at angle $\theta_d$. The interstation distance, $d$, is chosen such that when either station has maximum or minimum slit width, the other has some intermediate value producing the same fringe position, a minimum, on its respective detector. The resulting synchronized detector outputs can be utilized in two ways. The first and simplest, is to electronically sum the two outputs, thereby burying the spurious signals of one detector in the clean ones produced at the other station(s). For this purpose we utilize a summer 152 whose output waveform produces counts on container 153.

The other means of dealing with spurious detector signals corresponding to zero slit width is to avoid them altogether by switching between stations I and II, allowing each to feed counter 153 only when it is not in the maximum or minimum slit width region. In this case item 152 is a switching unit, whose switching impulse signal may be derived from the count on counter 153 from independent timing marks located on member 139, or from any other suitable source. While more sophisticated electronically, this method has several advantages. First, no spurious signals are ever produced. Second, directional information may be achieved by using phase quadrature signals derived from two detectors at a single station (using techniques discussed previously) without the necessity for additional stations.

There are a myriad of possible variations of this periodic repetition of $w$ device. For example, stations may be side by side using parallel rows of strips on member 139 or the diffraction wave producing means themselves may be adjacent in the $xy$ plane, using a cylinder lens or other suitable means to combine their waves. Furthermore, the summation process may be carried out optically and the opaque strips may be partially transparent instead. While the example utilized edges as diffraction wave producing means, other versions may be constructed using repetition of the other means discussed in this application. For example, two coarse, Ronchi Ruling type diffraction grating spreading means of the same spacing may be used, one stationary, the other a moving member such as 139 above located side-by-side in the $xy$ plane. Each is illuminated over sufficient width such that many edges are active. Thus small changes in the number of edges irradiated on the moving grating as it moves through the illumination field produce negligible changes in the fringe intensity at $\theta_d$.

The big advantage of the periodic w device is that the count resolution of the FIG. 3 apparatus (typically 0.1–1 micron) is achieved using a transparent "scale" or "grating" with a spacing of but 1 mm (or more). In other words up to an order of magnitude more resolution is obtained than in existing moire devices, with a grating which is two orders of magnitude less fine, while preserving the small, rugged nature of the device.

Finally, it should be noted that a circular, rather than linear, grating member 139 may be used, wherein the individual opaque and clear strips are located along radii of a circle equal angles apart and at the same radius. For a sufficiently large (say 2 cm) radius, two adjacent opaque strips are sufficiently parallel such that diffraction occurs substantially as before when waves from the strips edges interact with those from the edges of members 140 and 141.

In this circular form the invention constitutes a shaft angle encoder of outstanding characteristics since its coarse spaced circular grating can be made with less difficulty than the fine spaced type used in present incremental type encoders and its resolution may exceed present devices by an order of magnitude.

Besides the measurement of deflection of test members using waves diffracted by a naturally occuring edge of same, a large potential application is in the construction of sensing devices which cause two edges or other diffraction wave producing means to displace relative to one another in response to some variable. In this case the small, lightweight nature of the requisite diffraction wave producing means allows minimum interaction with the variable measured. This feature further allows mechanical multiplication of displacements (by lever arm systems, etc.) to be easily used, thereby providing increased displacement sensitivity.

The virtually unlimited choice of materials for diffraction wave producing means allows thermal compensation to be easily effected and allows devices to be constructed which may withstand severe environmental conditions.

Members including diffraction wave producing means may be acted on externally by the measured variable or internally such as the warping of organic members with humidity, and the bending, growth or shrinkage of other members with for example temperature or applied electric fields. In additon the member may be acted on by two forces simultaneously, as in the measurement of differential pressure, and each of the two members whose separation is monitored may be acted on by the same or different variables.

Nearly all transducer devices constructed or envisioned would use linear, one dimensional diffraction wave producing means, such as straight edges, diffraction gratings composed of linear strips, or the like. As noted previously, this produces the maximum utilization of incident light to sensing of unidirectional changes in separation, the usual application of such transducers. In addition, by illuminating a whole length $l$ of parallel diffraction wave producing means, the effect of dirt, corrosion, etc. at any one point along said length is minimized. Construction of the devices usually poses little problem, as the linear wave producing means can in most instances be made parallel by visual alignment of their diffracted waves. When this is not possible, special jig arrangements of the like can be used, or the cylinder lens technique described in connection with FIG. 10 may be employed.

The invention is useful to construct sensors of virtually all physical variables whose magnitude can be determined by monitoring their displacement of a member or members acted on by elastic, gravitational, magnetic or other restoring forces. Some examples are: force, acceleration, pressure, strain, temperature, humidity, voltage, current, torque, fluid flow, etc.

Illustrated in FIG. 9 is a strain gage device according to the invention particularly suited for long term measurement on large structural members. A comparison test currently in progress indicates that this gage is superior to all other known types, possessing outstanding accuracy and long term stability together with simple construction.

As shown, strains in concrete bridge member 196 cause members 197 and 198 to which edge members 199 and 200 are attached to displace, thereby changing the separation between members 199 and 200. Attachment of members 197 and 198 to the structural member can be by any suitable means, for example in the aforementioned test, pins were cast in the concrete and the members attached to the pins.

Illumination of the slit and readout of the interference fringe frequency to determine changes in slit width due to strain are accomplished using a portable readout device brought to each gage. In operation, this device is located in brackets or holes provided on the concrete and the slit illuminated. As shown, the gage is protected by housing 202 containing a viewing window 203. A flat mirror 201 located immediately behind edge members 199 and 200 redirects the interference pattern back into the readout device, where determination of $x$, $f$, or $s$, is made. This allows determination of $\delta x$ using previous equations and thence strain, E using the formula $$E = \frac{\Delta L_g}{L_g} = \frac{\delta x}{L_g} \qquad (17)$$

where $L_g$ is the gage length, as shown.

Operation of the readout device illustrated in FIG. 9 is as follows. A beam from gas laser 204 is focussed by convex lens 205 whose focal point coincides with that of objective lens 206, thereby recollimating the laser beam at a somewhat larger diameter. Reflected and diffracted radiation from the apertured mirror 201 from the strain gage is collected by lens 206 which causes a diffraction pattern to be produced in its focal plane. Mirror 207 angled at 45° and containing a hole 208 allowing the incident beam to pass, causes the pattern (less the region represented by the hole) to be displayed on screen 209 at the lens focal plane.

While many methods can be used to analyze the interference pattern, this example illustrates one of the simplest found to-date. Two versions are illustrated. In the first, a negative interference pattern of fringe spacing $s_o$ corresponding to the strain gage interference pattern spacing produced at a zero strain or other initial value, is placed on the screen. This filters the incoming diffraction pattern of spacing $s$, and moire fringes are produced of spacing $S = (s_o - s)/(s \cdot s_o)$. Measurement of the fringe spacing yields displacement since $\delta x = R \lambda/S$.

This moire technique has several interesting characteristics. First it yields displacement directly, since the initial condition is "remembered" by the filter pattern and optically subtracted, performing the equivalent of equation 9.

Second, the moire fringe spacing may be large and easily observable by the unaided eye even if in the diffraction pattern fringes themselves are not. This is important if very long focal length objective lenses 206 cannot be used. The moire fringe spacing is the same whether s is greater or less than $s_o$, and this must be accounted for.

A similar situation to the moire pattern is the use of a reference interference pattern provided by a slit, next to that formed by members 199 and 200, which may expand thermally but does not see mechanical strains in the member 196. A very quick look at the side by side diffraction patterns from each slit allows determination of such strain, merely by determining the lowest value of $\sin\theta$ at which a minima from each pattern coincides.

Another way of using filter patterns is to match the filter spacing to the diffraction pattern spacing, immediately determining the latter. Using filters crudely made on photographic film I have found that this matching or "null" condition can be determined by eye to better than 2.5 microns of displacement. Variable spacing filters are generally not easy to produce and a generally easier technique is to change $\lambda$, R, or w in a known manner until the diffraction pattern matches the filter.

There are three possible variable filter situations, however. The first is merely to place a number of discrete filters in turn against screen 209 and see which matches best. The other technique is to use a filter such as 210 whose frequency varies along its length. In this case a match always occurs at some $y$ position, and the position tells the diffraction pattern fringe spacing. Either method can be mechanized, and a photodetector used to determine the least light or null condition.

A filter whose frequency could be easily varied in place should be more desirable, and one such filter appears to be available: namely, a quartz crystal or other medium excited by ultrasonic waves produces a sine wave phase diffraction grating whose spatial frequency is proportional to the exciting electrical frequency. An interference pattern passing through such a crystal would definitely be affected in a different manner when its spatial frequency matched that in the crystal, and this condition could be monitored by a detection means.

By using the mirror 201, rather than locating the edges in the plane of the paper and using transmission, as in FIG. 1, a more compact apparatus results, and one which can be easily buried in the concrete, using a hollow tube or glass or plastic rod a few millimeters in diameter to conduct the laser beam to, and the interference pattern from, the edges. It is noted that the mirror should either be directly behind the edges, or some distance behind which is a function of $w$ and is usually around one cm, since intermediate locations produce distorted interference patterns.

When diffraction wave producing means of the type shown in FIGS. 6 or 7 are employed, the slits shown may equivalently be narrow strip mirrors on the ends of members 198 and 197. In this case, no mirror 201 is required. Similarly, reflective type diffraction gratings may also be used.

In the course of my work I have found that lens-like fiber optic waveguides of the SELFOC type, manufactured by Nippon Sheet Glass Company, Osaka, Japan can be used to not only convey gaussian laser beams to the diffraction wave producing means, as advertised, but that they also can transmit the interference patterns of varying spatial frequency generated by the invention as well. Thus communication with remotely located transducers, such as the strain gage of FIG. 9 is a definite possibility, especially if the price of such waveguides drops. For example, I have demonstrated the transmission of all the types of interference patterns generated in the apparatus shown in the above figures, over a half-meter long 0.75 mm diameter SELFOC Laser Guide, using a spherical lens to focus the already produced pattern into the guide.

For very small strains (i.e. displacements) mechanical multiplication can be incorporated between members 197 and 199 and/or between 198 and 200. Multiplication can be by lever arm, twisted strip etc., and reliable magnifications of up to 50 times can be simply incorporated.

Thermal compensation of strain gages for long term use is very important and is easily accomplished in the device of FIG. 9. While edge members 199 and 200 are chosen for their resistance to corrosion and other long term effects, the members 197 and 198 are chosen of material possessing nearly the same thermal coefficient of linear expansion as the concrete member being measured. In this manner, increases or decreases in gage length due to concrete thermal expansion produce little or no change in $w$. Thus measured changes in the interference pattern are due effectively to mechanical strains. Alternatively, if members 197 and 198 are of Invar, CIR-VIT or some other material with a very low coefficient of expansion, changes in the diffraction pattern will indicate the sum of both thermal and mechanical strains in the concrete. Clearly the invention can be used to measure thermal coefficient of expansion as well.

The thermal compensation considerations above may also be used to off-set the 2.5 A per degree centigrade wavelength shift of presently available diode lasers. In addition, when a transducer device is constructed using elastic members, the very small change of elastic modulus with temperature of said members can be compensated for as well. For example, a load cell may be easily constructed by connecting members 197 and 198 above to diametrically opposed positions on an elastic ring which deflects in a known manner with load, thereby changing $w$.

Due to uncertainty in strain direction, strain gages are often employed in rosettes, whereby strain in two or three directions at a location is monitored simultaneously. While two or three separate gages of the type disclosed can of course be used, it is also possible to produce a single two or three axis interference pattern whose fringe spacing along each axis is independently responsive to displacements in each direction. In the three axis, 120° rosette case, the aperture formed is roughly hexagonal, with opposite sides displacing (for example by means of individual sets of members of the 197, 198 type shown in FIG. 9) independently in response to strain. When a principal stress direction is known, it is only required to have a biaxial gage, and in this case a rectangular aperture may be formed using two sets of independently moving edges orthogonal to one another.

A further comment concerning long term measurements using the invention is considered appropriate. The fields of structural and environmental engineering, geology, oceanography, and meteorology all require long term measurement of forces, strains, displacements, pressures, accelerations, and other variables. For such measurement, together with those industrial, commercial and research applications where frequent recalibration is not desired, the invention appears to have no equal (at least regarding the actual displacement sensing itself).

Of particular interest is the use of devices such as illustrated in FIG. 9 to monitor the safety of structures, such as dams, bridges, pipelines, buildings, ship hulls, and airframes. The actual gage left on the structure can be very low in cost, allowing widespread diffusion of the gages to all critical locations. Better maintenance planning, as well as design information for future structures should also result.

Another use for the invention is in the measurement of object contour or profile. For example, if the piece of sheet material 36 in FIG. 3 is moved along the platen 35, fringes will sweep past the detector at angle $\theta_d$ in proportion to the change in height of the material above the platen. Use of a bi-directional output such as provided by the apparatus of FIG. 4, allows the material contour to be determined, relative to any initial location, such as the platen surface itself. This use is of extreme interest as a surface roughness transducer, wherein material contacting member 34 can be a diamond stylus whose movements could be mechanically multiplied such that one count every 0.05 micron is obtained in conjunction with electronic count multiplication as previously described.

Figure 10:
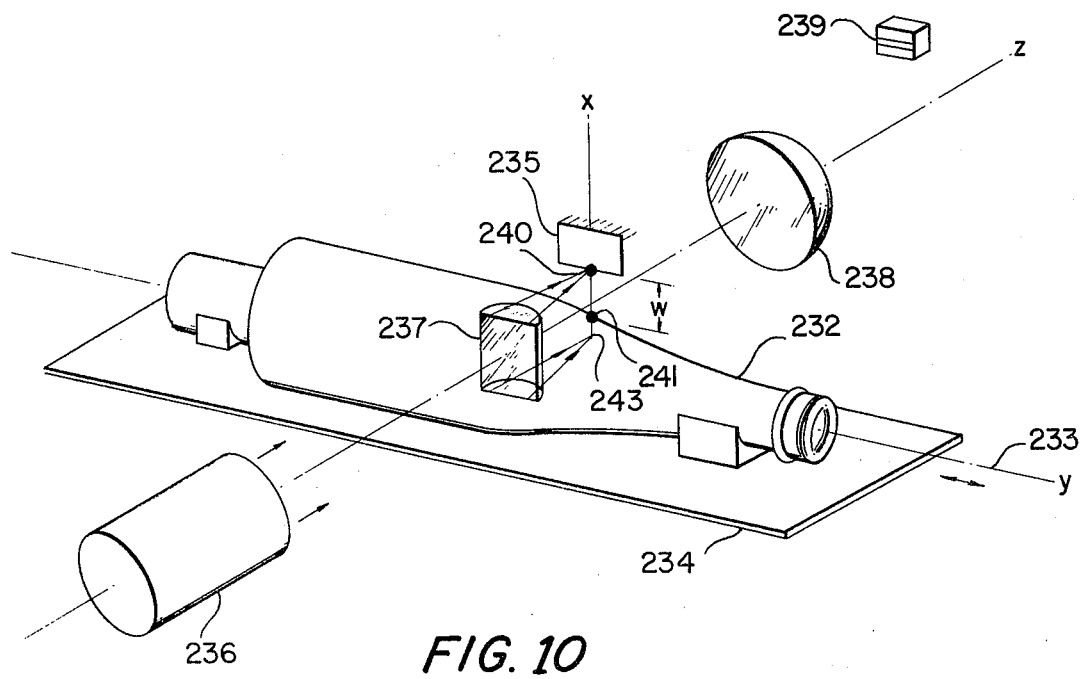
FIG. 10 is a diagrammatic side elevation of an embodiment of the invention for determining changes in separation caused by undulations in profile or contour of an object.

A similar profile measurement technique, this time using an edge of the measured object itself as a diffraction wave producing means is illustrated in FIG. 10. Here, a cylindrically symmetric object 232, having cylindrical axis 233, whose ends are supported in vee blocks attached to precision transport mechanism 234, is scanned past a detection position consisting of a straight edge diffraction wave producing means 235 fixed in reference to, and parallel to, the ways of transport mechanism 233 (and therefore the object axis within some error), a laser 236, cylinder lens 237 spherical lens 238 and detector 239.

The principles in the detection of changes in separation between object and reference edge are related to those described relative to FIGS. 3 and 4 above.

By using the cylinder lens to focus the laser beam to a line intersecting point 240 on reference edge 235 and point 241 object boundary 232 respectively, two important features result. First the interference pattern produced in the focal plane of the spherical lens 238 corresponds to but one value of $w$, approximately, and therefore its fringes are straight and perpendicular to the lens axis. Second, by the action of the cylinder lens, and especially lenses of short focal lengths (e.g. 20 mm or less), even grossly non-parallel propagation directions of diffracted waves from reference edge and object can result in interference patterns possessing usable fringes over some reasonable angle $\theta$. To-date reference edge-object non-parallelisms of up to 70° have been made to form usable interference patterns in this manner.

As object 232 is transported past the focal line 243, fringes pass the detector just as in the case above, and changes in $w$ from an initial value due to the object profile can be determined, and said profile obtained.

Several considerations are in order. First, consideration of equation (14) reveals that changes in object position in the z direction can also cause counts to be produced in this fixed angle $\theta_d$ detection system. In the example illustrated such changes are minimal and we recognize that because $\sin \theta_d \gg (1-\cos \theta_d)$ for small $\theta_d$, that for these angles small z changes may be neglected. It is however, possible to monitor both z and x change of the object using two detectors located at $\pm\theta_d$ respectively, a situation discussed in connection with FIG. 2 above.

Secondly, the technique shown could obviously be used to check diameter of parts by employing two stations one above (shown) and one below (i.e. 180° apart). Due to the detection speed possible using high speed photodetection and integrated counting circuits, bar stock, cables and other materials moving at high speed out of drawing dies, extrusion presses or the like could also be gaged.

The range of slit widths for which meaningful detection can occur is all important and in a system such as this it is generally possible to operate over the range $w_{max} = 0.5$ cm, $w_{min} = 0.1$ mm, if sufficient laser power and detector sensitivity is available to allow use of the very small detector required to resolve the fine spaced fringes produced at $w = 0.5$ cm. If various detector widths can be used, perhaps 2–3 cm range could be obtained. Where more range is required, the most convenient method is to utilize precisely changeable reference edge positions, a technique which functions as long as the incident laser beam and lens 238 are large enough in diameter. Of course different laser beam/lens arrangements could be used with each switch of reference edge to accomodate this. An alternative approach is to have a continually adjustable reference edge which is kept a constant distance from the object using a control signal from a split photocell located at angle $\theta_d$. The amount of servo motor drive voltage (rotations of a motor driven screw, etc) required to keep the edge at the specified position such that the photocell reads some chosen maxima or minima of the interference pattern then gives the object $y$ dimension.

The system functions equally well if the object is stationary and the laser beam/detector combination is scanned. There are many ways of accomplishing this, some capable of very high speeds relative to that obtainable by moving the object. Such high speed essentially allows a "stop action" profile to be obtained. Two serious considerations remain. First, those objects whose edge at some location is nearly parallel to the $x$ axis, cannot be reliably gaged at these locations using the system shown. Second, if the object profile reverses in the $x$ direction, a bi-directional detection system is ordinarily desired to sense this. The simplest is the $z$-factor type discussed above, but this becomes complicated if significant changes in z occur due to the object edge itself. Thus, it is generally preferable to use the two pattern type shown in FIG. 4, wherein the two reference edges are staggered in the z direction, away from the cylinder lens focal line on the object edge.

Not only do the devices shown appear outstanding in their own right, but their demonstrated unparalleled accuracy and long term stability makes their installation as calibration devices for other gages almost assured.

What is claimed is:

1. A method of determining a change in the separation of first and second members, said first member including means for producing a first diffraction wave, said second member including means for producing a second diffraction wave, said second diffraction wave producing means being separated from said first diffraction wave producing means, said first and second diffraction wave producing means each comprising a single boundary or a plurality of single boundaries spaced in a direction transverse to the direction of electromagnetic waves directed thereonto, each of said single boundaries being capable of producing a single diffraction wave upon incidence thereon of said electromagnetic waves, said method comprising the steps of:

directing electromagnetic waves onto said first and second diffraction wave producing means to produce an interference pattern including fringes positioned about an axis in the direction of propogation of said electromagnetic waves, said interference pattern being produced by interaction between said first and second waves;

detecting changes in intensity of electromagnetic radiation with detection means located at a fixed distance from the axis of said interference pattern to detect a portion of said fringes of said interference pattern as the fringes move past said detection means; and determining from said detected changes in intensity a change in separation between said first annd second diffraction wave producing means.

2. A method according to claim 1 wherein said means for producing said first diffraction wave comprises a boundary.

3. A method according to claim 1 wherein said means for producing said first diffraction wave comprises a first member having two boundaries, and said means for producing said second diffraction wave comprises a second member having two boundaries.

4. A method according to claim 1 wherein said first and second means for producing said first and second diffraction waves each comprise a diffraction grating.

5. A method according to claim 1 wherein said means for producing said first diffraction wave comprises a boundary of said first member, said first member being moveable relative to said second member such that the portion of said boundary upon which said electromagnetic radiation is directed is changed, said method including the further step of moving said boundary to change said portion of said boundary, and detecting changes in the intensity of an interference pattern produced by one portion of said boundary with an interference pattern produced by another portion of said boundary.

6. A method according to claim 1 wherein said means for producing said first diffraction wave and said means for producing said second diffraction wave are spaced a distance in the direction of said axis of said interference pattern.

7. A method according to claim 6 including the further step of detecting the intensity of electromagnetic radiation at an additional detection means a fixed distance from said axis of said interference pattern.

8. A method according to claim 7 wherein said distance in the direction of said axis of said interference pattern is selected such that the interference pattern fringe portion detected at the first mentioned detection means is not the same as the interference pattern fringe portion detected at said additional detection means.

9. A method according to claim 7 including the further step of counting the number of fringes moving relative to said second detection means.

10. A method according to claim 1 wherein said first member includes means for producing a third diffraction wave and said second member includes means for producing a fourth diffraction wave, said fourth diffraction wave producing means being separated from said third diffraction wave producing means, said separation being different from the separation of said first and second diffraction wave producing means, and wherein the process includes the further steps of:

directing electromagnetic waves onto said third and fourth diffraction wave producing means to produce a further interference pattern including fringes positioned about an axis in the direction of propogation of said electromagnetic radiation, said further interference pattern being produced by interaction between said third and fourth diffraction waves; and detecting changes in intensity of electromagnetic radiation with further detection means located at a fixed distance from said axis of said further interference pattern to detect motion of said fringes of said further interference pattern relative to said further detection means.

11. A method according to claim 1 wherein said step of detecting changes in intensity at said detection means includes detecting and counting the whole number of fringes and detecting and determining any fraction of a fringe of said interference pattern moving past said detection means.

12. A method according to claim 11 wherein said change in separation of said first and second members represents an event, said counting of fringes being accumulated over a plurality of events.

13. A method according to claim 11 including the step of determining the magnitude of any partial fringe moving past said detection means by changing the wavelength of said electromagnetic radiation a known amount such that a maximum or minimum is detected by said detection means.

14. A method according to claim 11 including the step of determining the magnitude of any partial fringe moving past said detection means by changing the separation of said first and second members a known amount such that a maximum or minimum is detected by said detection means.

15. A method according to claim 11 including the step of determining the magnitude of any partial fringe moving past said detection means by changing the position of said detection means a known amount such that a maximum or minimum is detected by said detection means.

16. A method according to claim 11 wherein a first source of electromagnetic radiation is used to direct waves onto said first diffraction wave producing means and a second source of electromagnetic radiation is used to direct waves onto said second diffraction wave producing means and including the step of determining the magnitude of any partial fringe moving past said detection means by changing the relative phase of the electromagnetic radiation incident upon said first and second diffraction wave producing means by a known amount such that a maximum or minimum is detected by said detection means.

17. A method according to claim 1 wherein said electromagnetic waves are passed through a cylinder lens.

18. A method according to claim 1 wherein said detection means comprises two adjacent detectors spaced in the direction of fringe spacing of said interference pattern and centered about the location of said detection means.

19. A method according to claim 1 wherein said first diffraction wave producing means comprises a member in contact with an object for determining motion of the object.

20. A method according to claim 1 wherein the step of determining said changes in separation comprises the step of counting the number of fringes moving past said detection means.

21. A method according to claim 1 wherein said electromagnetic radiation is directed onto said first and second diffraction wave producing means stroboscopically.

22. Apparatus for determining a change in the separation of first and second members, said first member including means for producing a first diffraction wave, said second member including means for producing a second diffraction wave, said second diffraction wave producing means being separated from said first diffraction wave producing means, said first and second diffraction wave producing means each comprising a single boundary or a plurality of single boundaries spaced in a direction transverse to the direction of electomagnetic waves directed thereonto, each of said single boundaries being capable of producing a single diffraction wave upon incidence thereon of said electromagnetic waves, said apparatus comprising:

means for directing electromagnetic waves onto said first and second diffraction wave producing means to produce an interference pattern including fringes positioned about an axis in the direction of propogation of said electromagnetic waves, said interference pattern being produced by interaction between said first and second waves;

means for detecting the intensity of electromagnetic radiation located at a fixed distance from said axis of said interference pattern for detecting changes in intensity of said electromagnetic radiation to detect a portion said fringes of said interference pattern as they move past said detection means; and means for determining from said detected changes in electromagnetic radiation a change in separation between said first and second diffraction wave producing means.

23. Apparatus according to claim 22 wherein said means for producing said first diffraction wave comprises a boundary.

24. Apparatus according to claim 22 wherein said means for producing said first diffraction wave comprises a first member having two boundaries separated in a direction transverse to the direction of said electromagnetic radiation, and said means for producing said second diffraction wave comprises a second member having two boundaries separated in a direction transverse to the direction of said electromagnetic radiation, each of said boundaries being capable of producing a single diffraction wave upon incidence thereon of said electromagnetic radiation.

25. Apparatus according to claim 22 wherein said first and second means for producing said first and second diffraction waves each comprises a diffraction grating.

26. Apparatus according to claim 22 wherein said means for producing said first diffraction wave comprises a boundary of said first member, said apparatus further comprising means for moving said first member relative to said second member such that the portion of said boundary on which said electromagnetic radiation is directed is changed.

27. Apparatus according to claim 22 wherein said means for producing said first diffraction wave and said means for producing said second diffraction wave are spaced a distance in the direction of said axis of said interference pattern.

28. Apparatus according to claim 27 including means for detecting the intensity of electromagnetic radiation at an additional location a fixed distance from said axis of said interference pattern.

29. Apparatus according to claim 28 wherein said distance in the direction of said axis of said interference pattern is selected such that the interference pattern fringe portion detected at the first mentioned detection means is not the same as the interference pattern fringe portion detected at said additional detection means.

30. Apparatus according to claim 28 including means for counting the number of fringes moving relative to said second detection means.

31. Apparatus according to claim 22 including cylinder lens means for passing said electromagnetic waves.

32. Apparatus according to claim 22 wherein said detection means comprises two adjacent detectors disposed colinearly with said interference pattern and centered about the location of said detection means.

33. Apparatus according to claim 22 wherein said detection means includes means for detecting and counting the whole number of fringes and means for detecting and determining any fraction of a fringe of said interference pattern moving past said detection means.

34. Apparatus according to claim 33 wherein said means for detecting any partial fringes moving past said detection means comprises means for changing the wavelength of said electromagnetic radiation a known amount such that a maximum or minimum is detected by said detection means.

35. Apparatus according to claim 33 wherein said means for detecting any partial fringes moving past said detection means comprises means for changing the separation of said first and second members a known amount such that a maximum or minimum is detected by said detection means.

36. Apparatus according to claim 33 wherein said means for detecting any partial fringes moving past said detection means comprises means for changing the position of said detection means a known amount such that a maximum or minimum is detected by said detection means.

37. Apparatus according to claim 33 including a first source of electromagnetic radiation for directing waves onto said first diffraction wave producing means and a second source of electromagnetic radiation for directing waves onto said second diffraction wave producing means and wherein said means for detecting any fraction of a fringe moving past said detection means comprises means for changing the relative phase of the electromagnetic radiation of said first and second sources by a known amount such that a maximum or minimum is detected by said detection means.

38. Apparatus according to claim 22 wherein said first member includes means for producing a third diffraction wave and said second member includes means for producing a fourth diffraction wave, said fourth diffraction wave producing means being separated from said third diffraction wave producing means, said separation being different from the separation of said first and second diffraction wave producing means, and wherein said apparatus further includes:

means for directing further electromagnetic radiation onto said third and fourth diffraction wave producing means to produce a further interference pattern including fringes positioned about an axis in the direction of propogation of said further electromagnetic radiation, said further interference pattern being produced by interaction between said third and fourth diffraction waves; and means for detecting changes in intensity of electromagnetic radiation with further detection means located at a fixed distance from said axis of said further interference pattern to detect changes in intensity to detect motion of said fringes of said further interference pattern relative to said further detection means.

39. Apparatus according to claim 22 wherein said first diffraction wave producing means comprises a member in contact with an object for determining motion of the object.

40. Apparatus according to claim 22 including means for directing said electromagnetic radiation onto said first and second diffraction wave producing means stroboscopically.

41. Apparatus according to claim 22 including means comprising a moveable member for masking the gap between said first and second diffraction wave producing means and means for moving said moveable member to unmask said gap, said moveable member having an edge forming a slit with one of said diffraction wave producing means as the gap is unmasked, the moving fringes of the interference pattern being formed as said gap is unmasked being countable to determine the magnitude of said gap width.

42. Apparatus according to claim 22 including means for changing the width of said detector relative to fringe spacing.

43. Apparatus according to claim 22 wherein said means for determining said changes in separation comprises means for counting the number of fringes moving past said detection means.

44. A method of determining changes in the separation of first and second members, said first member including means for producing a first diffraction wave, said second member including means for producing a second diffraction wave, said second diffraction wave producing means being separated from said first diffraction wave producing means, said first and second diffraction wave producing means each comprising a single boundary or a plurality of single boundaries spaced in a direction transverse to the direction of electromagnetic waves directed thereonto, each of said single boundaries being capable of producing a single diffraction wave upon incidence thereon of said electromagnetic waves, said method comprising the steps of:
directing electromagnetic waves onto said first and second diffraction wave producing means to form an interference pattern, said interference pattern including maxima and minima and, being produced by interaction between said first and second waves;
determining the location of a single maximum or minimum of said interference pattern;
comparing the location of a single maximum or minimum of said interference pattern with the location of a single maximum or minimum of a further interference pattern corresponding to a known separation of said first and second diffraction wave producing means; and
determining from said comparison the magnitude any change in separation of said first and second diffraction wave producing means relative to said known separation.

45. A method according to claim 44 wherein said interference patterns are recorded on a medium sensitive to said electromagnetic radiation and wherein the recordings are utilized to effect said comparison.

46. A method according to claim 44 wherein said maximum or minimum of the first-mentioned interference pattern is not the same as the maximum or minimum of said further interference pattern.

47. A method according to claim 44 wherein said means for producing said first diffraction wave comprises a boundary of said first member, said first member being moveable relative to said second member such that the portion of said boundary upon which said electromagnetic radiation is directed is changed, said method including the further step of moving said boundary to change said portion of said boundary, and detecting changes in the intensity of an interference pattern produced by one portion of said boundary with an interference pattern produced by another portion of said boundary.

48. A method according to claim 44 wherein said means for producing said first diffraction wave and said means for producing said second diffraction wave are spaced a distance in the direction of said axis of said interference pattern.

49. A method according to claim 44 wherein said first diffraction wave producing means comprises a member in contact with an object for determining motion of the object.

50. A method according to claim 44 wherein said electromagnetic radiation is directed onto said first and second diffraction wave producing means stroboscopically.

51. Apparatus for determining changes in the separation of first and second members, said first member including means for producing a first diffraction wave, said second member including means for producing a second diffraction wave, said second diffraction wave producing means being separated from said first diffraction wave producing means, said first and second diffraction wave producing means each comprising a single boundary or a plurality of single boundaries spaced in a direction transverse to the direction of electromagnetic waves directed thereonto, each of said single boundaries being capable of producing a single diffraction wave upon incidence thereon of said electromagnetic waves, said apparatus comprising:
means for directing electromagnetic waves onto said first and second diffraction wave producing means to form an interference pattern, said interference pattern being produced by interaction between said first and second waves;
means for determining the location of a single maximum or minimum of said interference pattern;
means for comparing the locations of a single maximum or minimum of each of a plurality of said interference patterns; and
means for determining from said comparison, the magnitude of any changes in separation of said first and second diffraction wave producing means.

52. Apparatus according to claim 51 including means for recording said interference patterns on a medium sensitive to said electromagnetic radiation.

53. Apparatus according to claim 51 wherein said means for producing said first diffraction wave comprises a boundary of said first member, said first member being moveable relative to said second member such that the portion of said boundary upon which said electromagnetic radiation is directed is changed, said method including the further step of moving said boundary to change said portion of said boundary, and detecting changes in the intensity of an interference pattern produced by one portion of said boundary with an interference pattern produced by another portion of said boundary.

54. Apparatus according to claim 51 wherein said means for producing said first diffraction wave and said means for producing said second diffraction wave are spaced a distance in the direction of said axis of said interference pattern.

55. Apparatus according to claim 51 wherein said first diffraction wave producing means comprises a member in contact with an object for determining motion of the object.

56. Apparatus according to claim 51 including means for directing said electromagnetic radiation onto said first and second diffraction wave producing means stroboscopically.

57. Apparatus according to claim 51 wherein said detection means comprises two adjacent detectors spaced in the direction of fringe spacing of said interference pattern and centered about the location of said detection means.

* * * * *